(12) United States Patent
Cull et al.

(10) Patent No.: US 7,476,035 B2
(45) Date of Patent: Jan. 13, 2009

(54) FIBER OPTIC CONNECTOR HAVING HERMAPHRODITIC COUPLING MECHANISM

(75) Inventors: Bryan D. Cull, Allen, TX (US); Jon M. Woodruff, Allen, TX (US); Jamie Castillega, Richardson, TX (US)

(73) Assignee: Fiber Systems International, Allen, TX (US)

( * ) Notice: Subject to any disclaimer, the term of this patent is extended or adjusted under 35 U.S.C. 154(b) by 0 days.

(21) Appl. No.: 11/734,658

(22) Filed: Apr. 12, 2007

(65) Prior Publication Data

US 2008/0253717 A1    Oct. 16, 2008

(51) Int. Cl.
*G02B 6/38* (2006.01)
(52) U.S. Cl. ............................ 385/60; 385/53; 385/56; 385/59; 385/64; 385/66; 385/77; 385/78; 385/139
(58) Field of Classification Search ............. 385/60, 385/53, 54, 56, 58, 59, 64, 76, 77, 78, 84, 385/66, 139
See application file for complete search history.

(56) References Cited

U.S. PATENT DOCUMENTS

| 2,285,510 | A | 6/1942 | Stanley | 385/53 X |
|---|---|---|---|---|
| 4,140,366 | A | 2/1979 | Makuch et al. | 385/53 X |
| 4,258,977 | A | 3/1981 | Lukas et al. | 385/53 X |
| 4,493,529 | A | 1/1985 | Doty | 385/53 X |
| 4,496,213 | A | 1/1985 | Borsuk | 385/53 X |
| 4,595,839 | A | 6/1986 | Braun et al. | 250/551 |
| 4,812,007 | A | 3/1989 | Lukas | 385/53 X |
| 4,877,303 | A | 10/1989 | Caldwell et al. | 385/53 X |
| 4,878,730 | A | 11/1989 | Wall | 385/53 X |
| 5,000,536 | A | 3/1991 | Anderson et al. | |
| 5,064,268 | A | 11/1991 | Morency et al. | 385/87 |
| 5,280,556 | A | 1/1994 | Jones | 385/139 |
| 5,283,848 | A | 2/1994 | Abendschein et al. | 385/89 |

(Continued)

OTHER PUBLICATIONS

Corning Cable Systems LLC, No Epoxy/No Polish Fiber optic Connectors, Jul. 2000, 2 pages.

(Continued)

*Primary Examiner*—Brian M Healy
(74) *Attorney, Agent, or Firm*—Howison & Arnott, L.L.P.

(57) ABSTRACT

A hermaphroditic connector for mounting to a cable having a plurality of optical fibers and connecting the fibers to mating optical fibers wherein the optical fibers and mating optical fibers have termini mounted to the respective ends thereof, and wherein the termini of at least one of the optical fibers is slidably mounted and biased to provide a predetermined amount of longitudinal travel during connection includes a plug insert for mounting the termini, a generally cylindrical plug body for receiving the plug insert through an open end thereof, the plug body including a mating end with a plurality of mating features configured to cooperate with corresponding mating features of a second connector to align the termini of the first and second connectors in opposed relationship, a plurality of ears extending radially from the mating end of the plug body, a coupling nut slidably mounted on the plug including a groove formed between a plurality of ribs extending around an inside nut so that rotation of the coupling nut in a forward position captures the ears of the connector and the ears of the second connector in the groove in opposed relationship between the ribs.

42 Claims, 14 Drawing Sheets

U.S. PATENT DOCUMENTS

| | | | | |
|---|---|---|---|---|
| 5,394,494 | A | 2/1995 | Jennings et al. | 385/58 |
| 5,515,466 | A | 5/1996 | Lee | 385/78 |
| 5,590,229 | A | 12/1996 | Goldman et al. | 385/59 |
| 5,608,828 | A | 3/1997 | Coutts et al. | 385/59 |
| 5,796,896 | A | 8/1998 | Lee | 385/59 |
| D412,312 | S | 7/1999 | Myers | D13/133 |
| 5,980,317 | A | 11/1999 | McNeel | 439/559 |
| 6,022,150 | A | 2/2000 | Erdman et al. | 385/81 |
| D424,020 | S | 5/2000 | Fischer | D13/146 |
| 6,068,410 | A | 5/2000 | Giebel et al. | 385/72 |
| 6,081,647 | A | 6/2000 | Roth et al. | 385/139 |
| 6,179,481 | B1 | 1/2001 | Sung | 385/78 |
| 6,305,849 | B1 | 1/2001 | Roehrs et al. | 385/59 |
| 6,206,579 | B1 | 3/2001 | Selfridge et al. | 385/60 |
| 6,234,683 | B1 * | 5/2001 | Waldron et al. | 385/78 |
| 6,234,693 | B1 | 5/2001 | Waldron et al. | 400/73 |
| 6,298,190 | B2 * | 10/2001 | Waldron et al. | 385/134 |
| 6,357,928 | B1 * | 3/2002 | Haley et al. | 385/59 |
| 6,357,929 | B1 | 3/2002 | Roehrs et al. | 385/59 |
| 6,371,660 | B1 | 4/2002 | Roehrs et al. | 385/59 |
| 6,485,191 | B1 | 11/2002 | Sato | 385/73 |
| 2001/0019654 | A1 * | 9/2001 | Waldron et al. | 385/134 |

OTHER PUBLICATIONS

Siecor, No-Epoxy/No-Polish Fiber Optic Connectors Unicam Multimode Connectors, Apr. 1997, 2 pages.

Amphenol, "HDM Series, Hermaphroditic Duplex Miniature," Data Sheet, Mar. 30, 2000.

* cited by examiner

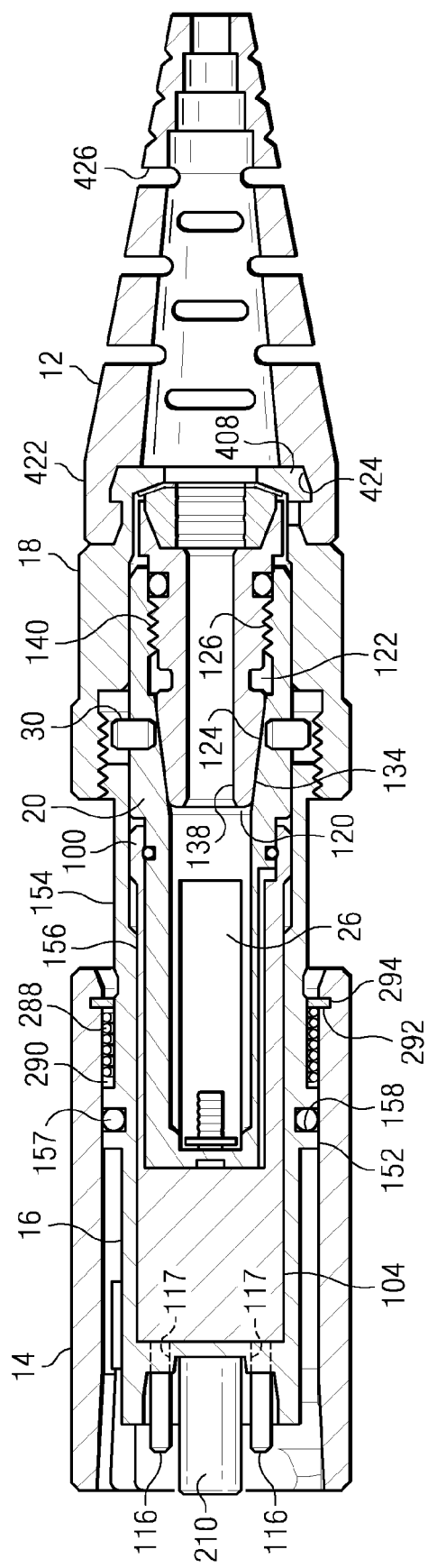
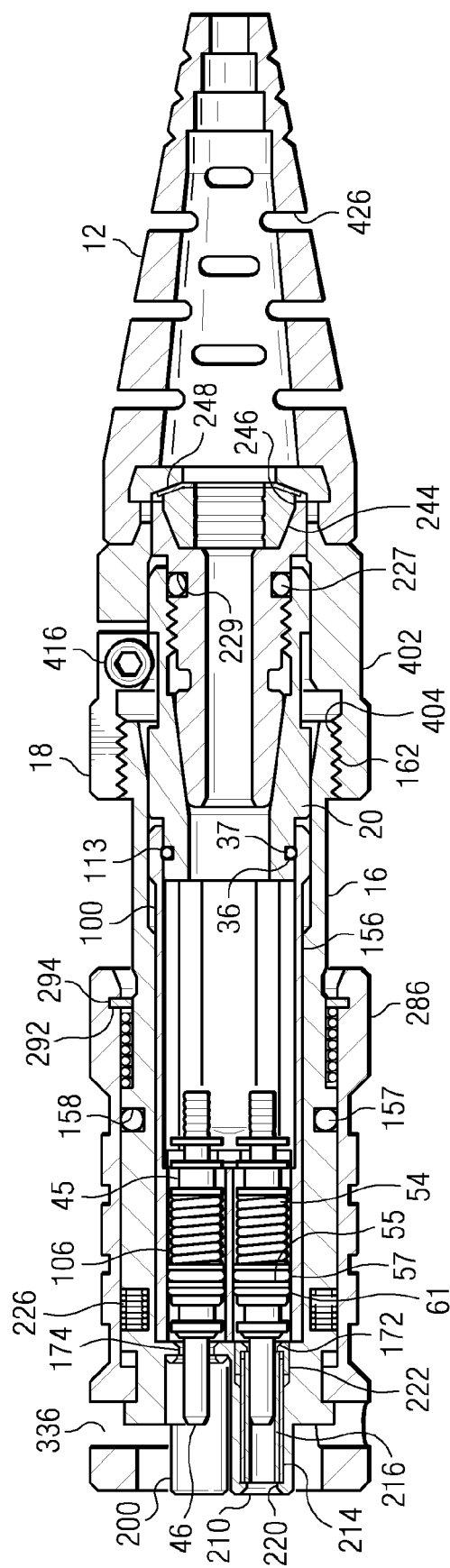
FIG. 4
FIG. 5

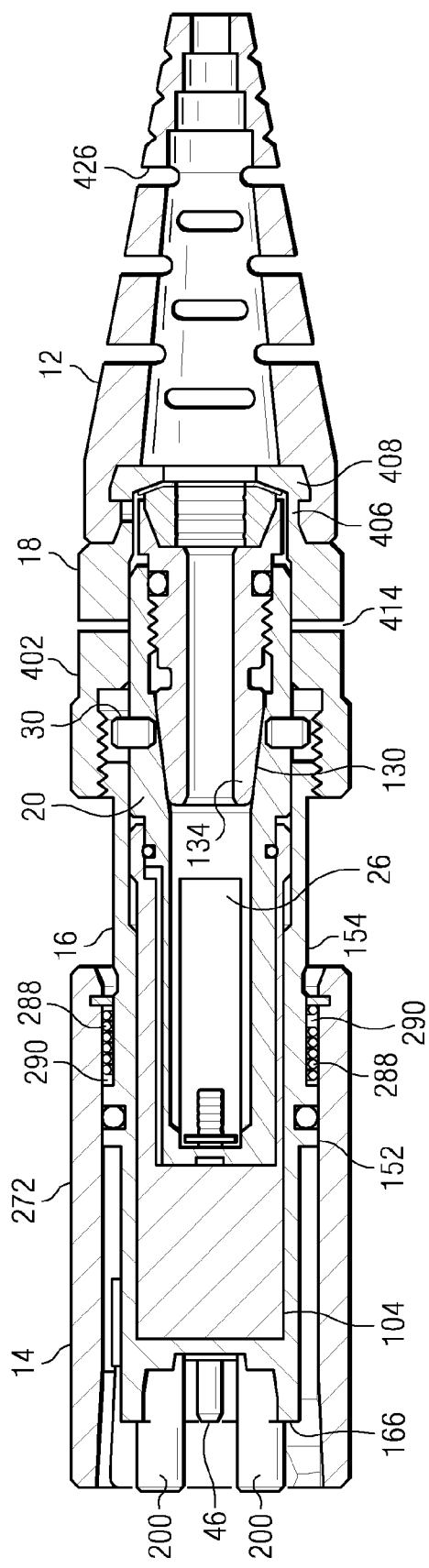
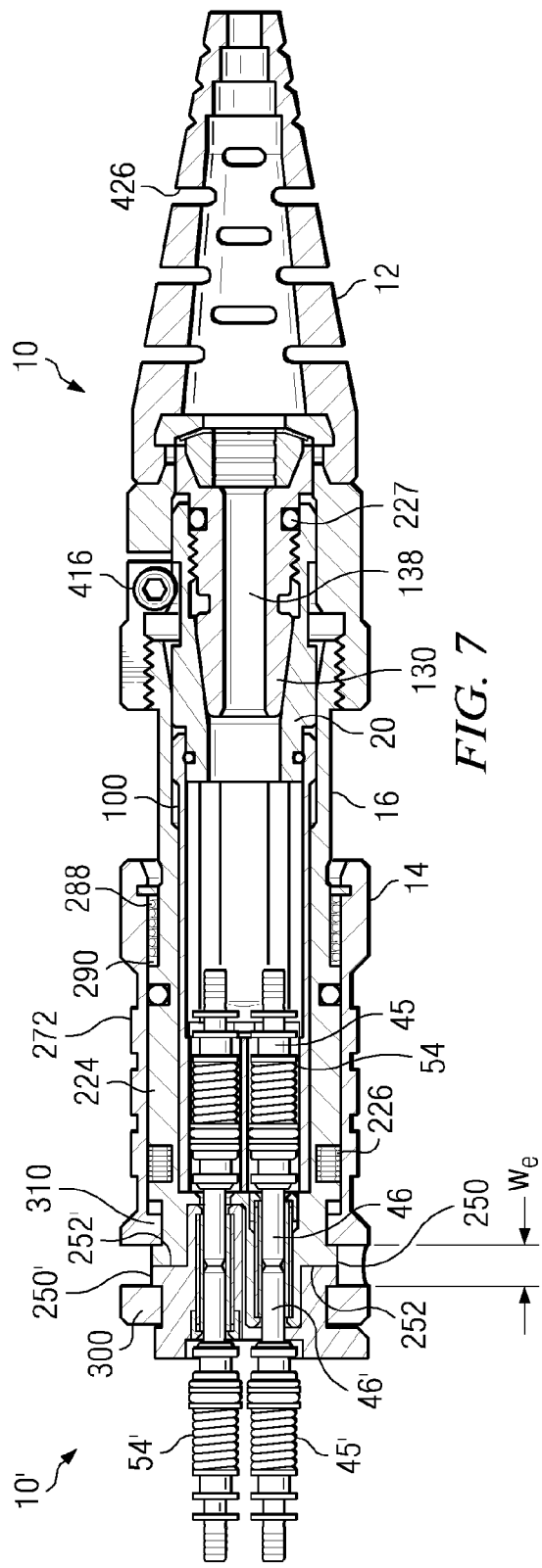

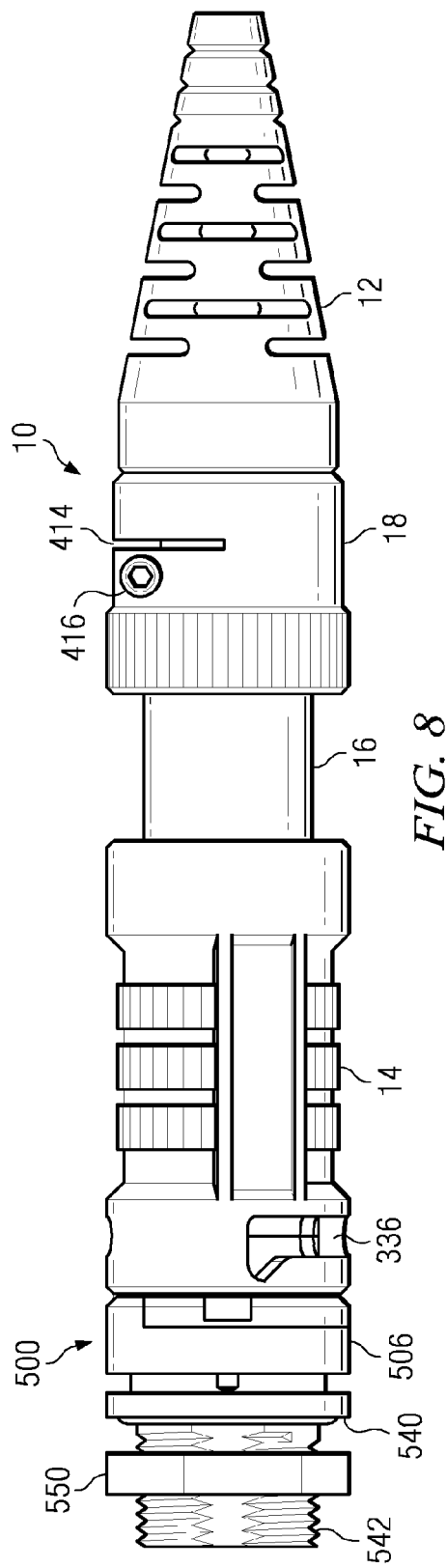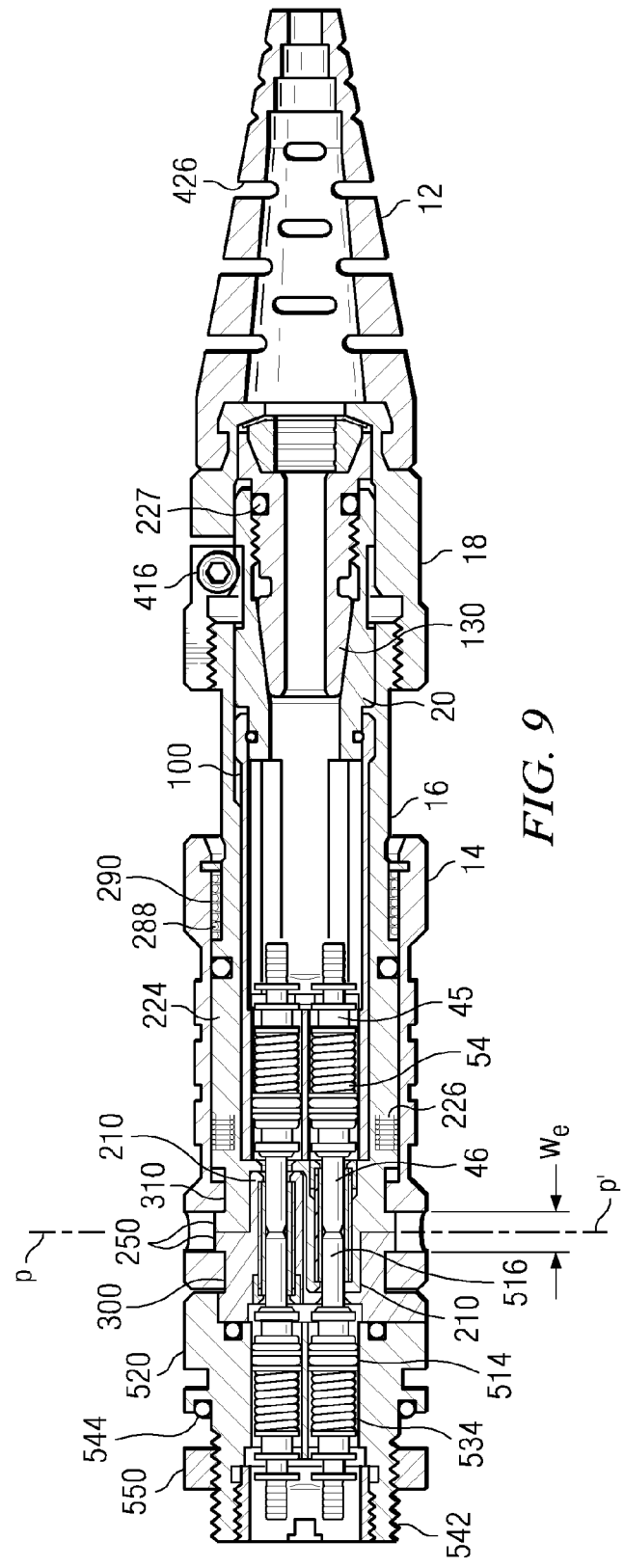

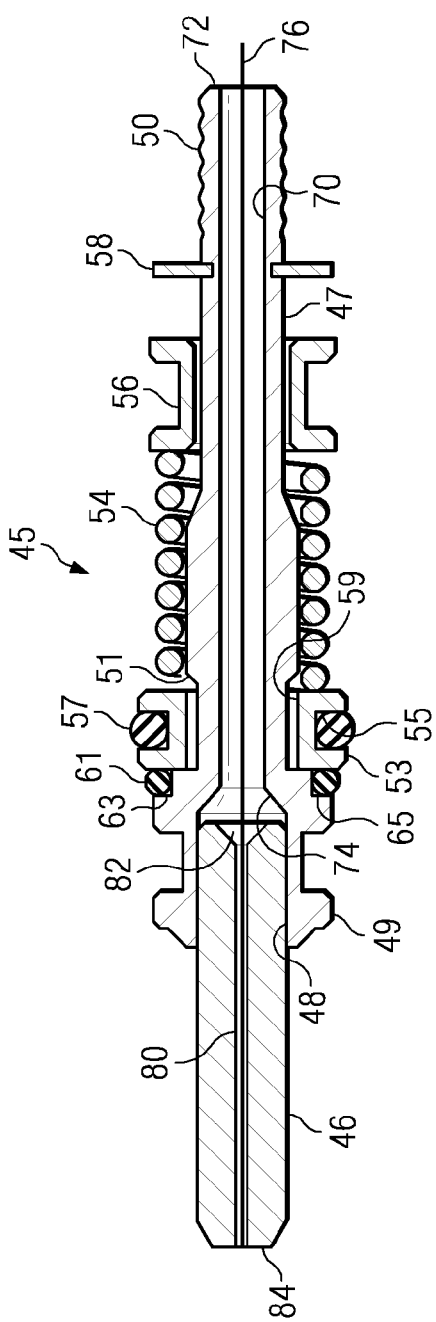
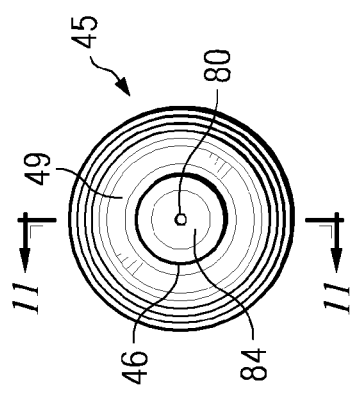
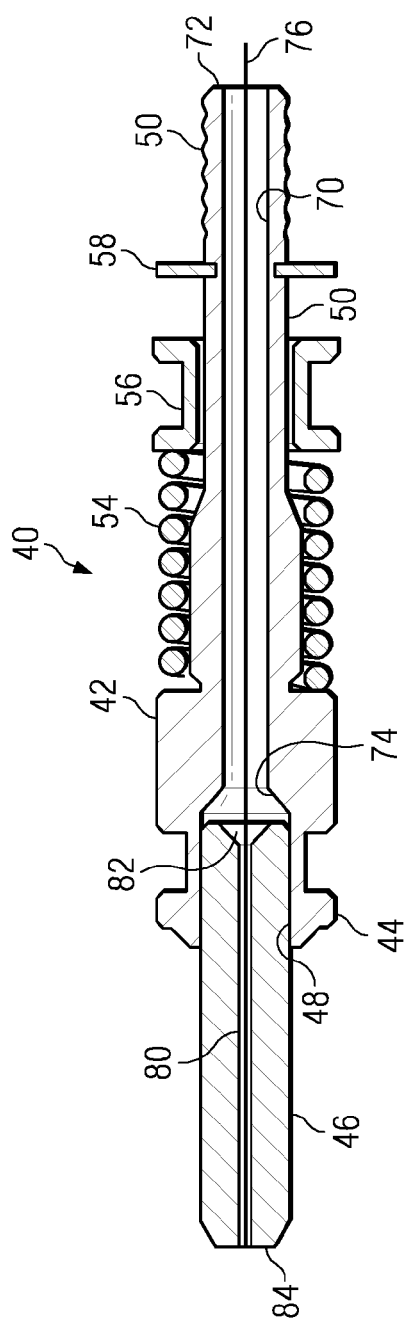
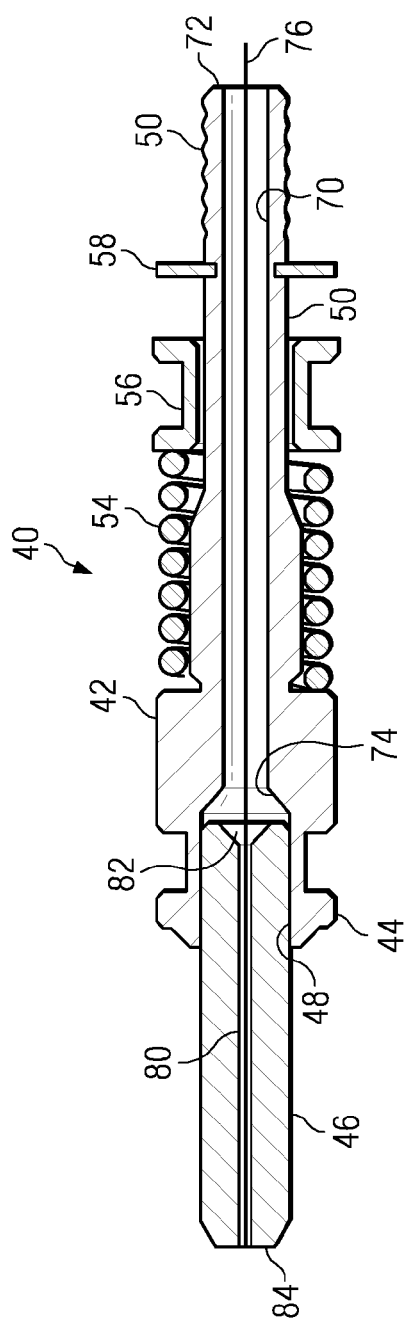

FIBER OPTIC CONNECTOR HAVING HERMAPHRODITIC COUPLING MECHANISM

TECHNICAL FIELD

The disclosure relates to fiber optic connectors and in particular, to a hermaphroditic coupling mechanism for such connectors.

BACKGROUND OF THE INVENTION

Hermaphroditic couplers for fiber optic cable must incorporate features that allow the coupler to perform as either a female or male plug such that identical connectors may be coupled to each other. Known hermaphroditic couplers utilize either a conventional threaded configuration wherein a coupling nut moves to a rearward or forward position or a bayonet configuration. The drawback to the threaded connection is that the coupling nut must be rotated through a number of turns to mate with the opposing connector.

Bayonet type connectors are known that use a pin or pins extending inward from a fixed coupling nut. The pins engage J-shaped grooves, one in the first connector body, the second in the mating connector body. The pins engage and slide through the long leg of the J-shaped groove then through the crook of the J and into the short leg or locking recess of the J-shaped groove to prevent the coupling nut from inadvertently loosening. In the case of a plug connecting to a plug, there may be four pins, two of which engage each of the connectors to provide a secure connection. In the case of a panel mounted receptacle, which does not include a coupling nut, there are only two pins, only one of which engages the receptacle.

There are two drawbacks to conventional bayonet connectors, the first being the movement of the connector faces as the pins move into the locking recess or short leg of the J-shaped groove. Typically the connector faces mate tightly together at the point where the pins are at the endmost tip of the crook of the J-shaped grooves. As the pins move through the crook and into the locking recess, the mating faces tend to move apart. Thus, the depth of the short leg of the J-shaped groove translates into a space between connector faces that may allow angular movement of the connectors relative to each other.

The second drawback of conventional bayonet type connectors is that when the plug is mated into a panel mounted receptacle, only one of the bayonet pins engages the receptacle. In this configuration, only one side of the plug is secured. A normal force applied to the plug may result in angular movement of the plug relative to the receptacle. In the case of fiber optic cables, such movement can result in the terminal ends of the cables being displaced from each other, interfering with or cutting off the transmission carried by the cable.

The magnitude of these problems is increased in the case of single mode cables. Multi-mode cables have a core with a nominal diameter from about 50 to 100 microns, typically on the order of 62.5 microns. Alternatively, single mode cables have a core with a nominal diameter of 8-10 microns, typically on the order of 9 microns. Single mode cables are capable of greater transmission speed over longer distances with less signal attenuation; however, because of the small core diameter, alignment of single mode cores with a connector is more critical than in the case of a multi-mode fiber. Alignment of the fibers becomes even more of an issue in the case of multiple channel single mode cables where multiple fiber optic connections must be aligned with a high degree of precision.

SUMMARY

A hermaphroditic connector for mounting to a cable having a plurality of optical fibers and connecting the fibers to mating optical fibers having termini mounted on the ends thereof including a plug insert for mounting the termini and a generally cylindrical plug body for receiving the plug insert therein. The plug body includes a mating end having a plurality of mating features configured to engage the corresponding mating features of a second connector to align the termini of the connector with the termini of a second connector in opposed relationship. A plurality of ears extend radially outward from the forward end of the mating end of the plug body.

The connector includes a coupling nut slidably and rotatably mounted on the plug body and having a generally cylindrical wall and a groove for receiving an ear of the connector and the ear of a mating connector in opposed relationship therein. The groove extends around an inside surface of the cylindrical wall adjacent a first end of the coupling nut so that the groove is aligned with an ear of the connector and an ear of a second connector when the coupling nut is moved to its forward position. Rotation of the coupling nut captures the ear of the connector and the ear of a second connector in opposed relationship in the groove.

The connector may include a spring disposed in annular space between the plug body and the coupling nut for biasing the coupling nut in a rearward position on the plug body. In one variation, a pair of ears are positioned at opposed positions on the circumference of the mating end of the plug body and the ears pass through a pair of opposed openings into the groove when the coupling nut is moved into the forward position. In another aspect, the connector includes a shield for mounting the plug insert in the plug body wherein the shield includes alignment features for aligning the shield and plug insert in a selected rotational orientation relative to the plug body. The alignment features may include a plurality of pins extending longitudinally forward from the shield for engaging bores formed in the plug body.

In another embodiment, a hermaphroditic connector includes a plug insert for mounting the termini and a plug body for receiving the plug insert therein. The plug body has a central longitudinal axis and a mating end with first and second openings extending longitudinally therethrough for receiving the ends of termini therein. The openings are positioned on either side of a plane extending longitudinally thorough the plug body perpendicular to a line connecting the centers of the openings and intersecting the longitudinal axis of the plug body which divides the mating end into first and second halves. A generally cylindrical tower having a longitudinal passage therethrough aligned with the first opening for receiving an end of a termini of a corresponding mating connector extends from the first half of the mating end of the plug body. First and second mating pins having first opposed concave faces defining a tower receiving aperture therebetween for receiving the tower of a corresponding mating connector extend longitudinally from the second half of the mating end of the plug body. The mating pins include substantially flat second faces aligned with the plane dividing the mating end into first and second halves and substantially convex third faces disposed between the first and second faces. The first half of the mating end of the plug body includes first and second recesses formed therein on opposing sides of the tower for receiving the mating pins of a corresponding mating connector. The recesses include first, substantially concave walls formed on opposing sides of the tower, second substantially flat walls aligned with the plane dividing the mating end into first and second halves and substantially convex third walls disposed between the first and second walls.

In one aspect, the connector further includes a pair of circumferentially opposed ears extending radially from the mating end of the plug body between a pair of chords equidistant from the axis of the plug body and perpendicular to the plane dividing the mating end into first and second halves. In one embodiment, the ears have a semi-circular cross section and a combined radial length of approximately 15% to 20% of the diameter of the mating end of the plug body. In another aspect, the connector includes a pair of alignment pins extending from the forward end of the mating end of the plug body. The mating pins of the connector have longitudinally extending bores formed therein for receiving the alignment pins of a corresponding connector.

In yet another embodiment, the connector includes a plug insert for mounting the termini, a plug body for receiving the plug insert therein and a radially extending stop wall formed on an outside surface of the cylindrical wall. The connector further includes a generally cylindrical coupling nut having a stop formed on an inside surface thereof. The stop of the connector engages the stop wall of the plug body (same connector) upon rotation of the coupling nut to couple the connector with the mating connector such that rotation of the coupling nut is limited to a predetermined arc. The predetermined arc may be between about 80 degrees and about 110 degrees.

In another aspect, the connector further comprising a compressible retaining member positioned in a recess formed in an outside surface of the stop wall. A corresponding projection extends radially inward from an inside wall of the coupling nut for engaging the compressible retaining member of a corresponding second connector Upon rotation of the coupling nut, the projection of a corresponding second connector compresses and passes the retaining member to engage the connector with a corresponding mating connector, the compressible member retaining the coupling nut in engagement with the mating connector by preventing inadvertent reverse rotation of the coupling nut. The compressible member may be a spring, a solid resilient body, a compressible cylinder or a spring-biased body having an arcuate surface for engaging the projection. In one variation, the projection is wedge-shaped with an inclined wall to facilitate engagement with a compressible member of a corresponding mating connector.

In still another embodiment, a hermaphroditic connector for mounting to a cable having a plurality of optical fibers and connecting the fibers to mating optical fibers includes a plug body and a plug insert having a generally cylindrical body including a circular forward face formed integral with the body including a plurality of apertures extending through the face and configured for slidably mounting termini in the plug insert. The plug insert further comprises an axial slot extending rearwardly from the face and at least one axial slot extending rearward from the forward face. The slot is sufficiently long and wide to form an "s-ing" chamber in which optical fibers connected to the termini may flex upon coupling of the connector with a corresponding second connector with the faces of the connectors in abutting relation. A rear section of the plug insert extending rearward of the slot includes a rearwardly opening socket, a forwardly tapered hole having a substantially conical wall that opens into the slot and a central passage extending axially between the socket and the forwardly tapered hole. A wedge having a nose with profile substantially matching a portion of the wall of the forwardly tapered hole is operable to engage the plug insert and compress and hold the strength member of a fiber optic cable between the wedge and the conical wall. The socket may include internal threads to engage a threaded end portion of the insert for coupling the wedge into the socket.

In another aspect the connector comprises an end cap enclosing the plug insert, the end cap including internal threads for threadedly engaging corresponding threads on a rear end of the plug body, the end cap including at least one longitudinally extending slot that enables the end cap to be compressed onto the plug body with a set screw. In yet another aspect, the plug insert includes recesses formed around each of the apertures for retaining termini in the apertures.

BRIEF DESCRIPTION OF THE DRAWINGS

For a more complete understanding, reference is made to the drawings, wherein like reference numbers are used herein to designate like elements throughout, and wherein:

FIG. 4 is a first partial sectional and partial cutaway view of the connector of FIG. 1 taken along line 4-4 of FIG. 2;

FIG. 5 is a second partial sectional and partial cut away view of the connector of FIG. 1, rotated ninety degrees from the view of FIG. 4, taken along line 5-5 of FIG. 2;

FIG. 6 is a third partial sectional and partial cut away view of the connector of FIG. 1, rotated ninety degrees from the view of FIG. 5 and one hundred eighty degrees from the view of FIG. 4, taken along line 6-6 of FIG. 2;

FIG. 7 is a partial sectional and partial cut away view of the connector of FIG. 1 coupled to a second, identical connector with portions of the second connector omitted;

FIG. 8 is a side view of the connector of FIG. 1 coupled to a mating receptacle;

FIG. 9 is a partial sectional and partial cutaway view of the connector and receptacle of FIG. 8;

FIG. 10 is a front end view of a terminus illustrated in FIG. 1;

FIG. 11 is a sectional view of the terminus of FIG. 10 taken along line 11-11 of FIG. 10;

FIG. 12 is a front end view of an alternate terminus suitable for use in connection with the connector of FIG. 1;

FIG. 13 is a sectional view of the terminus of FIG. 12 taken along line 13-13 of FIG. 12;

DETAILED DESCRIPTION

Figure 1:
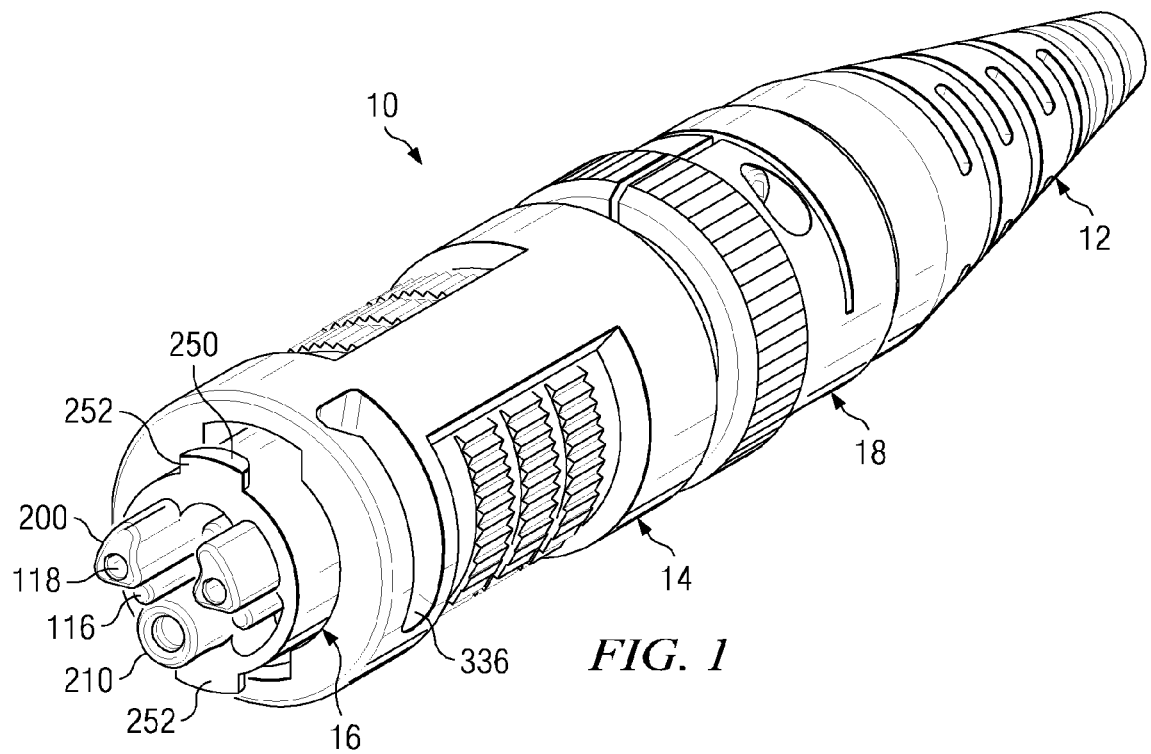
FIG. 1 is a front perspective view of a connector in accordance with one embodiment.

Referring to FIGS. 1-7, in one embodiment, a hermaphroditic connector 10 for connecting a two channel single mode fiber optic cable includes a coupling nut 14 slidably mounted over a plug body 16. An end cap 18 is positioned over rear end of plug body 16 with a resilient boot 12 mounted on the rearmost end of end cap 18.

As best illustrated in FIGS. 3-7, connector 10 includes a plug insert 20 mounted in plug body 16 for mounting a plurality of termini 45 inside the connector. Termini 45 are configured for mounting on the terminal ends of optical fibers to enable mating of the fibers. Plug insert 20 includes generally cylindrical front section 22 and a larger diameter rear section 24. A longitudinal slot 26 or "s-ing" chamber formed in forward section 22 of plug insert 20 between a forward circular face 28 of the front section and rear section 24 provides a space in which fiber optic cables may flex when connector 10 is mated to another connector 10 or to receptacle. Termini 45 are slidably mounted in a pair of circumferentially opposed semicircular apertures or cutouts 32 formed in the forward most face 28 of plug insert 20. Face 28 with cutouts 32 forms a guide or "snowflake" integral with plug insert 20 for retaining termini 45 in position in the insert.

Figure 3:
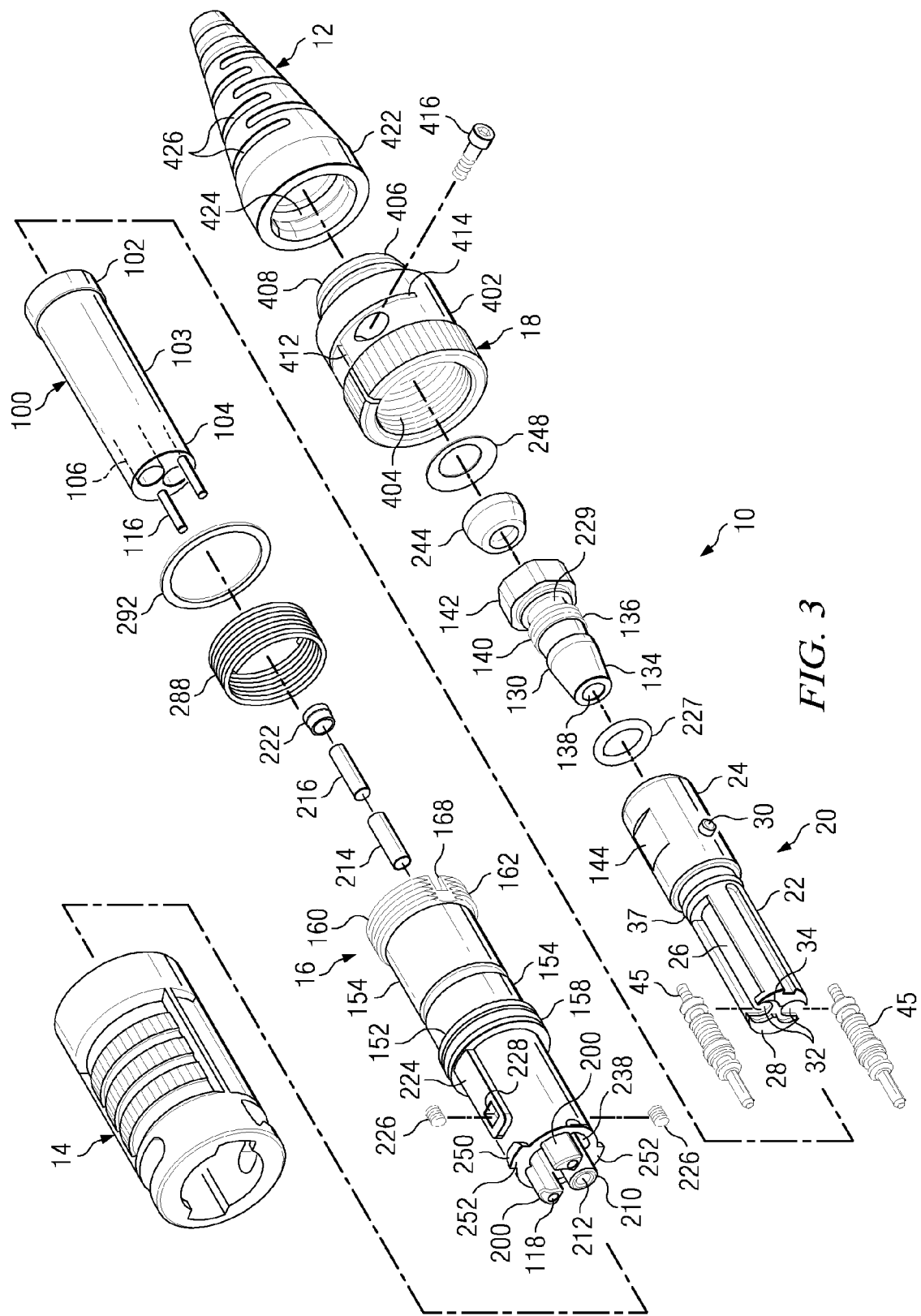
FIG. 3 is an exploded view of the connector of FIG. 1.
Figure 14:
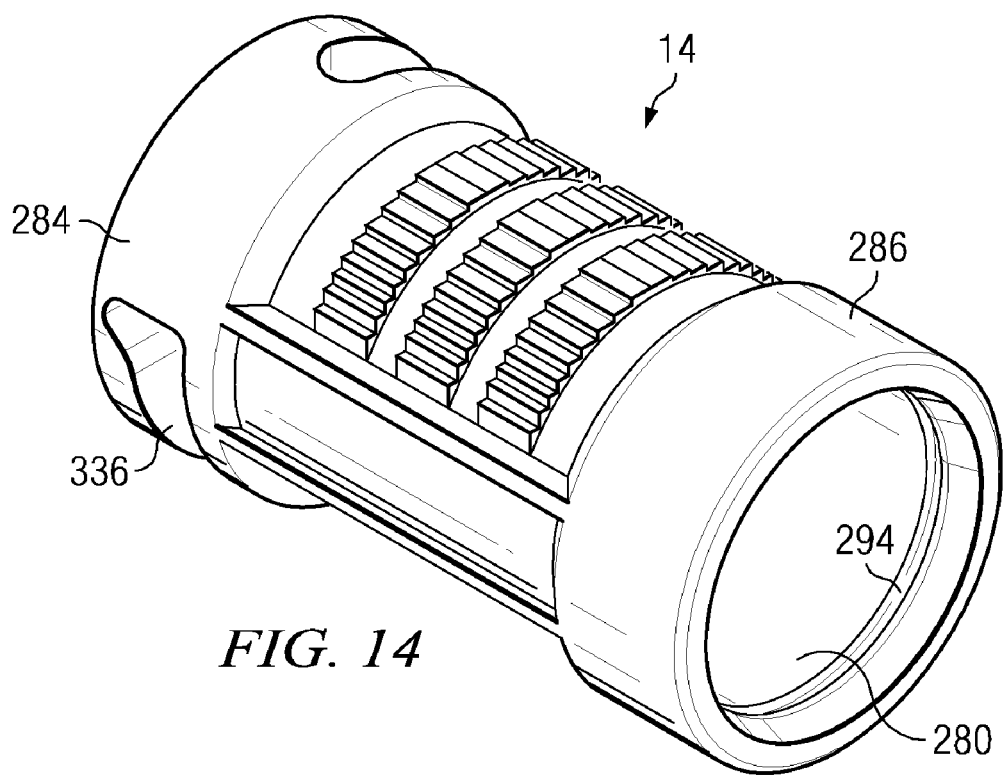
FIG. 14 is a first perspective view of the coupling nut illustrated in FIG. 1.
Figure 15:
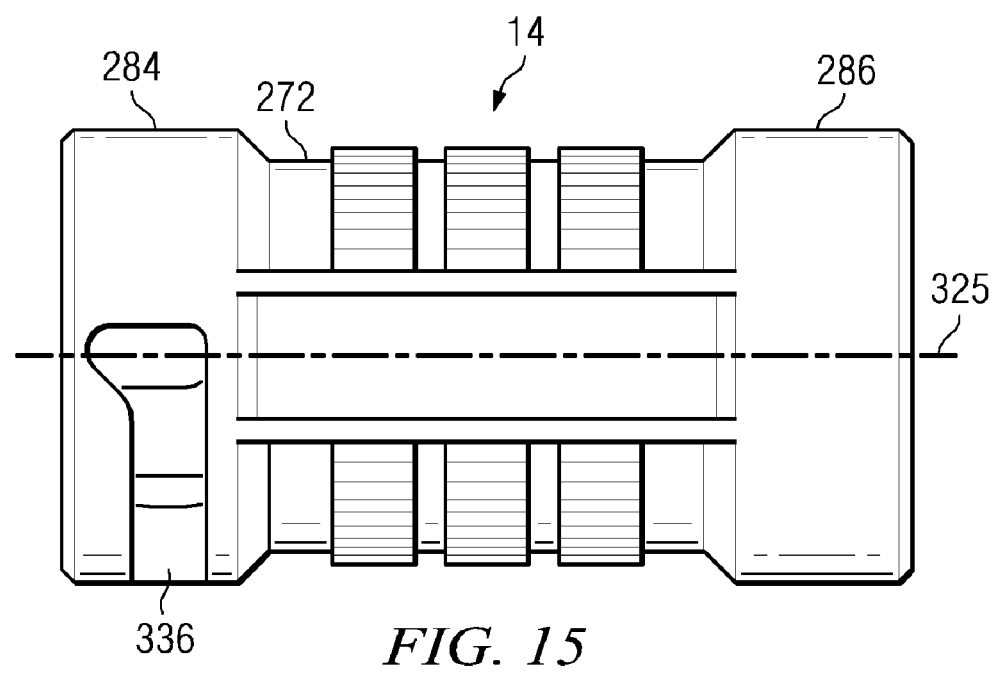
FIG. 15 is a side view of the coupling nut of FIG. 14.
Figure 16:
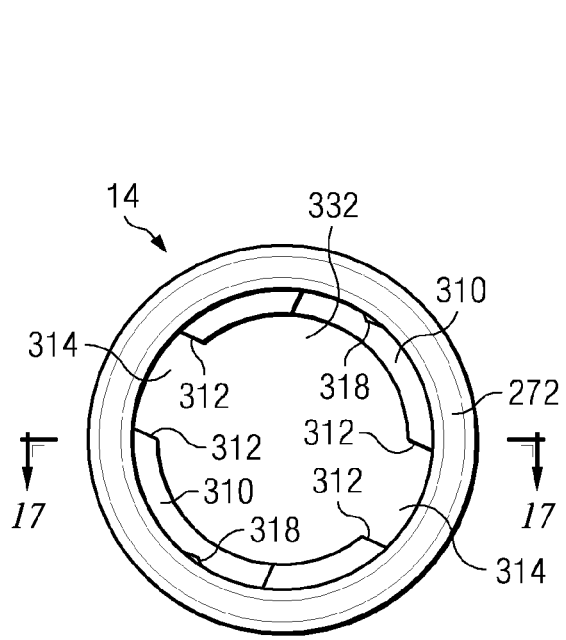
FIG. 16 is a rear end view of the coupling nut of FIG. 14.
Figure 17:
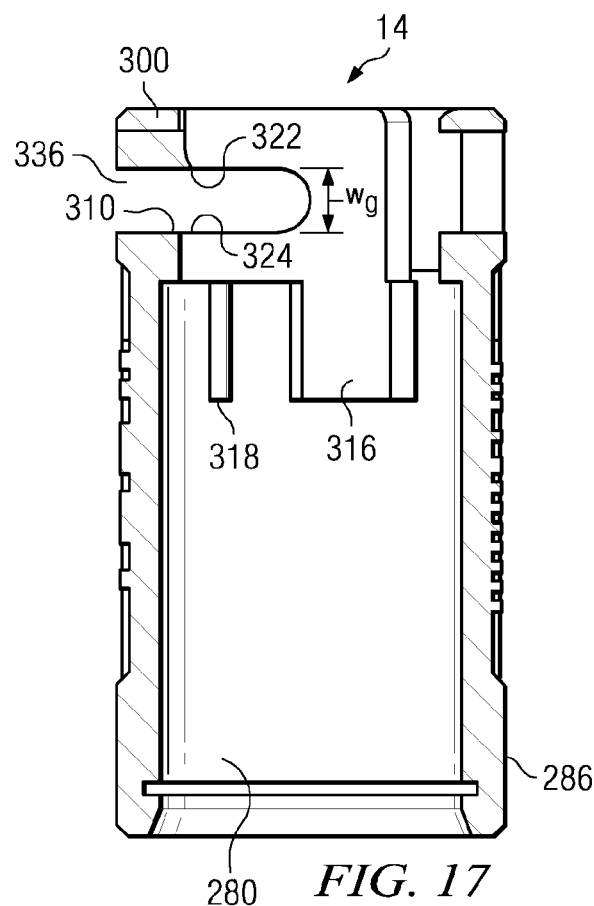
FIG. 17 is a sectional view of the coupling nut of FIG. 14, taken along line 17-17 of FIG. 16.
Figure 18:
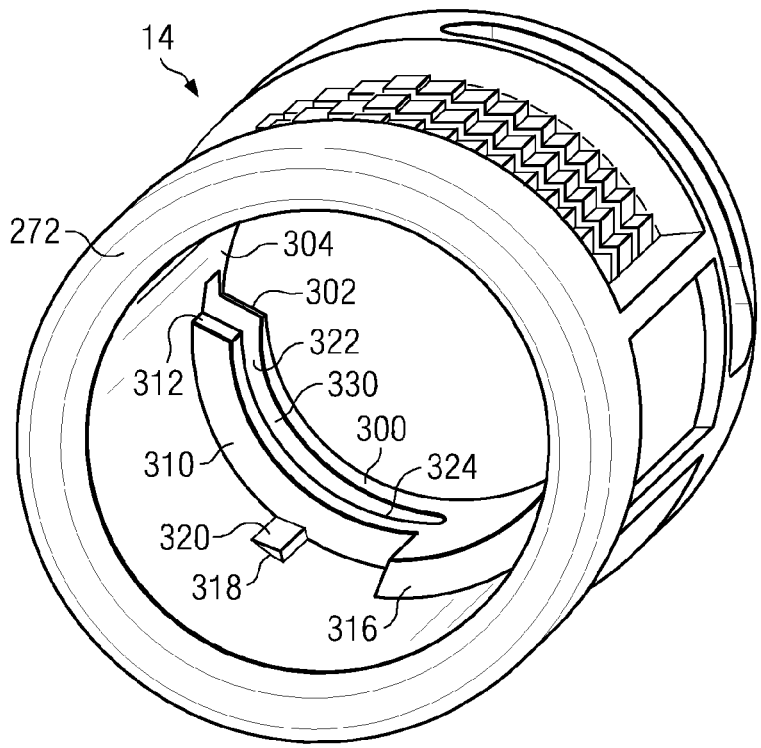
FIG. 18 is a second perspective view of the coupling nut of FIG. 14.

Turning to FIGS. 3, 10 and 11, terminus 45 includes a pin body 47 with an enlarged generally cylindrical forward portion 49 having a ceramic ferrule 46 fitted into a longitudinal recess or socket 48 formed in the forward portion 49. Socket 48 may have a slight inward taper to facilitate press fitting ferrule 46 into the socket. Terminus 45 is mounted on plug insert 20 with a smaller diameter rear end portion 50 of pin body 42 passing through cutout 32.

A coil spring 54 fitted over end portion 50 of pin body 47 biases a slip collar 56 against the front of face 28 of plug insert 20. Slip collar 56 is sized to fit into a recess or counterbore 34 formed around cutout 32 to aid in positioning the collar. A retainer such as E-clip 58 is fitted over rear end portion 50 of pin body 47, engaging one of a plurality of grooves formed in the end portion. E-clip 58 is positioned against the rear of face 28 such that the slip collar 56 and retainer 58 are on opposing sides of face 28.

Spring 54 is compressed between enlarged end portion 49 and a floating annular ring 53, biasing the slip collar against the front of face 28. When connector 10 is coupled to a mating connector, as illustrated in FIG. 7, ferrule 46 is pressed against the ferrule end of a mating terminus, forcing pin body 47 to move rearward, compressing spring 54. Spring 54 maintains a biasing force against pin body 47, holding ferrule 46 against the ferrule end of the mating terminus while permitting rearward longitudinal movement of ferrule 46 and pin body 47 over a predetermined distance.

A circumferential groove 51 formed in the outer surface of forward portion 49 receives annular ring 53, which in turn includes a groove 55 for receiving an O-ring 57. Ring 53 is formed with an inside diameter that is larger than the outside diameter of forward portion 49 across circumferential groove 51 such that an annular space 59 is formed between ring 53 and forward portion 49. The arrangement of ring 53 in groove 51 enables the ring, along with O-ring 57, to float relative to pin body 47 when terminus 45 is positioned in bore 106 of shield 100, permitting O-ring 57 to conform more closely to the inside surface of the bore. A second O-ring 61 is mounted in an annular space 63 formed by the forward end of ring 53 and a circumferential recess 65 formed in forward portion 49 of pin body 47. O-ring 61 seals the interface between pin body 47 and ring 53.

While pin body 47, slip collar 56 and spring 54 are preferably formed from a suitable metal, it is contemplated that the pin body may be formed from other materials such as suitable plastics and/or ceramics. Similarly ferrule 46 may also be formed from materials other than ceramics such as a suitable plastic or metal.

A bore 70 for receiving optical fiber 76 extends from the rearmost end 72 of pin body 47 to an outwardly tapering section 74 that opens into socket 48. A corresponding bore 80, aligned with bore 70, extends through ferrule 46. A tapered guide section 82 formed at the rearmost end of ferrule 46 aids in guiding optical fiber 76 into bore 80. Bore 80 has a diameter slightly larger than the cladding of the fiber optic which is secured in the bore with an epoxy or similar adhesive. After the optical fiber is secured in ferrule 46, the fiber is cleaved flush with the forward end 84 of the ferrule and polished to facilitate operative connection of the ferrule with a mating ferrule.

FIGS. 12 and 13 illustrate an alternate terminus 40 wherein groove 51, annular ring 53 and O-rings 57 and 61 are omitted. Terminus 40 includes a pin body 42 with a generally cylindrical forward portion 44 having a ceramic ferrule 46 fitted into socket 48. Terminus 40 may be suitable for use in applications where the compliant sealing mechanism of terminus 45 is deemed unnecessary. The remaining components of terminus 40 are substantially identical to the correspondingly numbered components of terminus 45 and function is substantially the same manner.

Turning to FIGS. 3-7, a generally cylindrical shield 100 fits over front section 22 of the plug insert 20, covering termini 45. Shield 100 is typically metal, but may be formed from other materials. Shield 100 includes an expanded diameter rearwardly opening portion 102, a center portion 103 and a solid forward portion 104 having longitudinal bores 106 for receiving termini 45 extending therethrough. Alignment of shield 100 and plug insert 20 with plug body 16 is accomplished with a pair of offset alignment pins 116 that extend longitudinally from the forward end of the shield.

Alignment pins 116 are configured to fit into and through holes 117 formed in the face 170 of plug body 16 and into bores 118 in each of a pair of mating pins 200 of a corresponding mating connector. Pins 116 are positioned on the same side of and offset from a diameter of the shield so that shield 100 can be positioned in only one rotational orientation relative to plug body 16 to align the pins with holes 117. This configuration of pins 116 insures that each of ferrules 46 are each aligned with the corresponding mating ferrule when connector 10 is coupled to a second connector or shield. The length of alignment pins 116 is such that the pins must enter holes 117 before ferrules 46 approach the rear side of face 170 as the shield 100 is slid over plug insert 20. This arrangement prevents ferrules 46 from contacting the rear face of forward portion 104 of shield 100 rather than entering bores 106, thereby reducing the possibility of damage to the ferrules and the optical fibers mounted therein.

Referring to FIGS. 3, 5 and 11, as shield 100 is slid over insert 20, bores 106 receive the forward end portions 49 of pin bodies 47 such that ferrules 46 extend forward from the shield with the forward ends of the pin bodies flush with the forward end of the shield. The diameter of bores 106 is only slightly larger than that of the forward portions 49 of pin bodies 47 so as to maintain proper alignment of ferrules 46. O-ring 57 mounted in a groove 55 formed in the outside surface of forward portion 40 of pin body 47 seals between the inside wall of bore 106 and the pin body. An annular groove 113 formed on the inside surface of enlarged end portion 102 of shield 100 is aligned with corresponding groove 36 in the front section 22 of plug insert 20 to receive O-ring 37 to aid in retaining shield 100 on plug insert 20. O-ring 37 also serves as an environmental seal preventing foreign material from entering the plug insert/shield assembly.

As best illustrated in FIGS. 3, 4 and 5, plug insert 20 includes a central opening 120 extending longitudinally between the rearmost end of the insert and "s-ing" chamber 26. Opening 120 includes a rearwardly opening socket 122 having internal threads 126 and a forwardly tapering conical hole 124 that extends from socket 122 to chamber 26. A wedge 130 including a conical nose 134 having a profile to match conical hole 124 and a cylindrical middle section 136 with exterior threads 140 for engaging threads 126 of socket 122 secures a fiber optic cable in insert 20. The cable is extended through a central bore 138 passing longitudinally through wedge 130 and the strength member of the cable, typically a woven sheath of high strength synthetic material such as Aramid® or Kelvar® strands is wrapped over the nose of the wedge.

Wedge 130 is inserted into opening 120 and rotated to engage threads 140 with threads 126 of socket 122. As wedge 130 is tightened, the cable strength member is pinched between nose 134 and the wall of conical hole 124, securing the cable in the insert. A hexagonal nut 142 formed at the rear end of wedge 130 allows tightening of the wedge with a wrench. Similarly, flats 144 formed on the exterior of plug insert 20 allow the insert to be grasped with a wrench as the wedge is tightened. An O-ring 227 seated in a groove 229 formed around the outside of perimeter of wedge 130 rearward of threads 140 seals between wedge 130 and insert 20.

Shield 100 with plug insert 20 is fitted into plug body 16. Plug body 16 includes a cylindrical wall 154 that defines a rearwardly opening cavity 156 for receiving plug insert 20 and shield 100. An annular ring 152 formed midway along the length of plug body 16 includes a groove 158 for receiving an O-ring 157 that seals between plug body 16 and coupling nut 14. An enlarged rear end portion 160 of plug body 16 includes exterior threads 162 for engaging corresponding interior threads 404 of a cylindrical end cap 18.

End cap 18 encloses plug insert 20 and wedge 130 in plug body 16. End cap 18 includes an enlarged forward cylindrical wall 402 having internal threads 404 formed therein and a second, rear cylindrical wall 406 having a radially extending lip 408 formed around the outer perimeter of wall. A first, longitudinal slot 412 extends rearwardly from the forward end of wall 402, intersecting a second slot 414 that extends approximately 180 degrees around the circumference of wall 402. Slots 412 and 414 allow wall 402 to be compressed and locked onto the rear end portion 160 of plug body 16 with a set screw 416 after end cap 18 has been threaded onto the plug body.

A hollow conical resilient boot 12 is fitted onto end cap 18 to inhibit lateral flexing of a fiber optic cable passing through end cap 18 into connector 10. Boot 12 includes a forward cylindrical collar 422 with an annular groove 424 formed on the inside surface of the collar. Boot 12 is manufactured from a stretchable synthetic rubber or similar material such that the collar 422 can be stretched to fit over wall 406 with lip 408 engaging groove 424 to secure the boot on end cap 18. Boot 12 may be provided with a series of slots or cuts 426 extending partially around the circumference of the boot at spaced apart intervals. The width and spacing of slots 426 may be varied to control the resistance of the boot 12 to lateral flexing.

A fiber optic cable passing through boot 12 and end cap 18 extends through a resilient seal grommet 244 positioned in a rearwardly opening recess 246 formed in the rearmost end of wedge 130. Grommet 244 provides a seal around a fiber optic cable passing through end cap 18 into wedge 130. A conical washer 248, formed from a low friction material, protects seal grommet 244 from deformation as end cap 18 is tightened onto plug body 16.

Plug body 16 includes a pair of circumferentially opposed, longitudinal slots 168 formed in end portion 160 of the body. Slots 168 receive a corresponding pair of cylindrical projections or keys 30 that extend radially from the rear end portion 24 of plug insert 20. Engagement of keys 30 in slots 168 insures proper alignment of plug insert 20 and termini 45 relative to plug body 16.

Referring to FIGS. 2, 4-9 and 19 and 19A-B the forward or mating end 166 of plug body 16 includes a recessed circular face 170 having openings 172, 174 through which ferrules 46 extend. In one embodiment, the diameter of mating end 166 is approximately 0.56 inches and the distance between the centers of openings 172, 174 is approximately 0.2 inches. Openings 172, 174 are formed in opposing half sections 178, 180 of face 170. Opposing half sections 178, 180 of face 170 are defined by a plane 175 (FIG. 2) that extends through plug body 16 along a central longitudinal axis of the body perpendicular to a line connecting the centers of openings 172, 174.

A hollow cylindrical tower 210 extending longitudinally from first half section 178 of face 170 of plug body 16 includes a central passage 212 extending longitudinally through the tower. In one embodiment, tower 210 has a diameter of approximately 0.19 inches and extends approximately 0.21 inches beyond the forward most end 166 of plug body 16. Tower 210 is formed over opening 172 with passage 212 aligned with the opening to receive a ferrule of a second connector in mating relationship with ferrule 46 of connector 10. A split sleeve 216 is positioned inside a cylindrical shroud 214 coaxial with opening 172 and passage 212 to align ferrule 46 in a mating orientation. Shroud 214 and sleeve 216 are retained between a lip 220 formed around the inside circumference of the forward end of passage 212 and an annular retainer 222 fitted into the rear end of passage 212. In one variation, sleeve 216 is formed from a ceramic material while shroud 214 is constructed from an appropriate metal. It is, however, contemplated that sleeve 216 and shroud 214 may be formed from any suitable metal, ceramic, plastic or other material.

Figure 2:
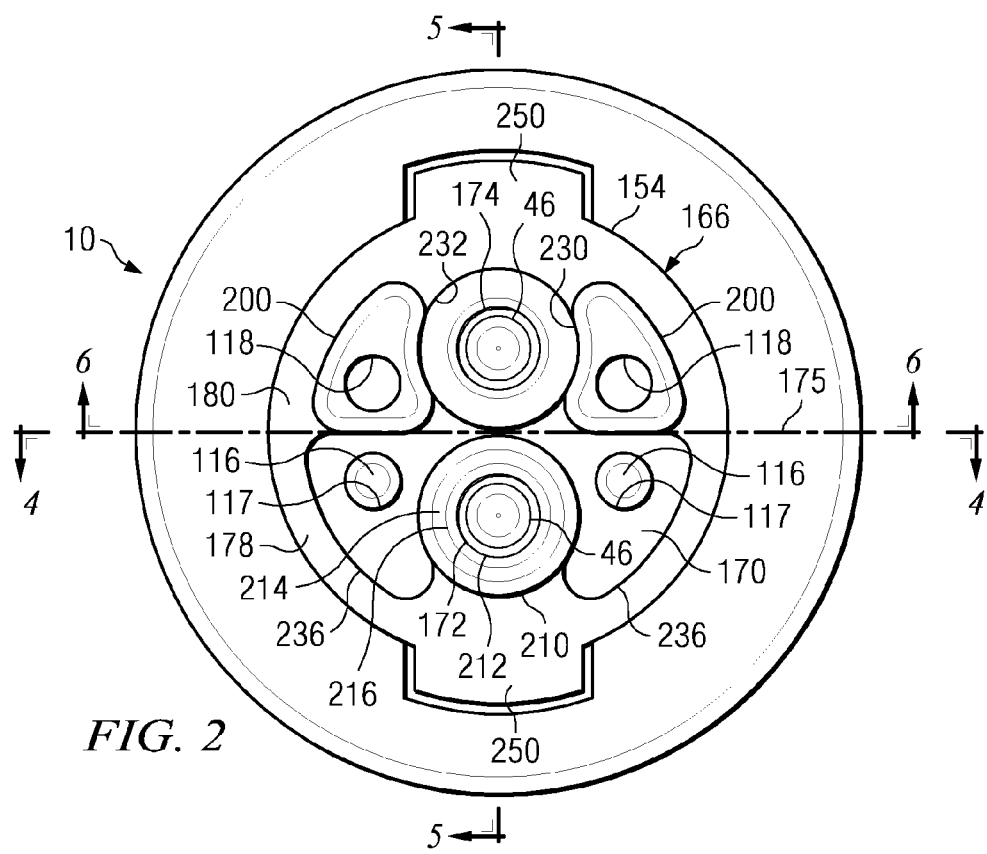
FIG. 2 is front end view of the connector of FIG. 1.
Figure 19:
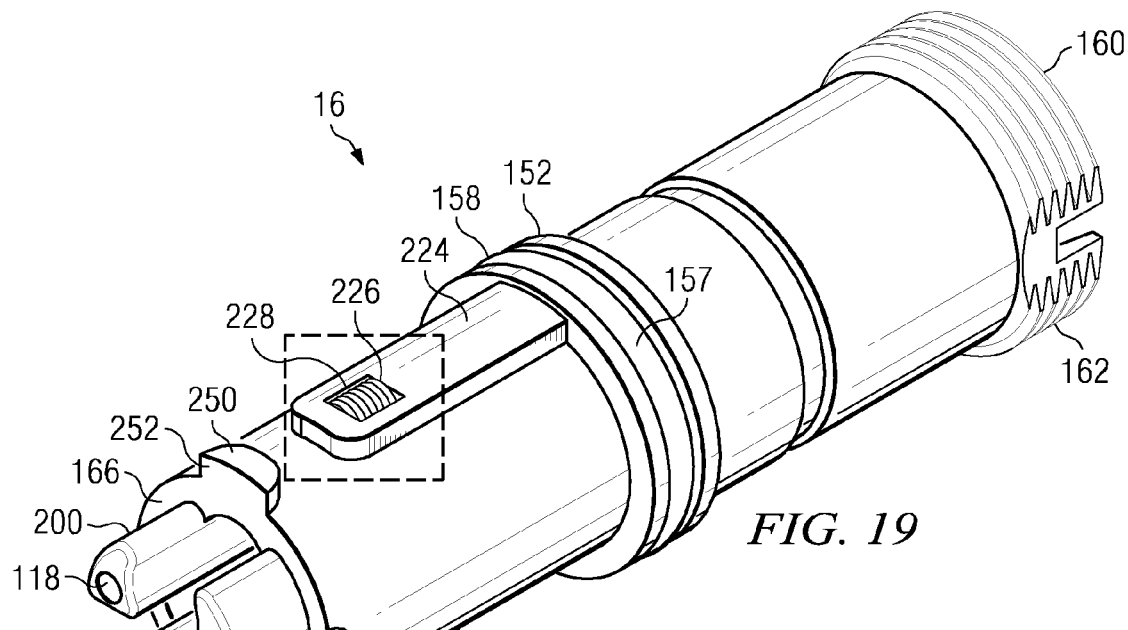
FIG. 19 is an enlarged perspective view of the plug body illustrated in FIG. 1.
Figure 19A:
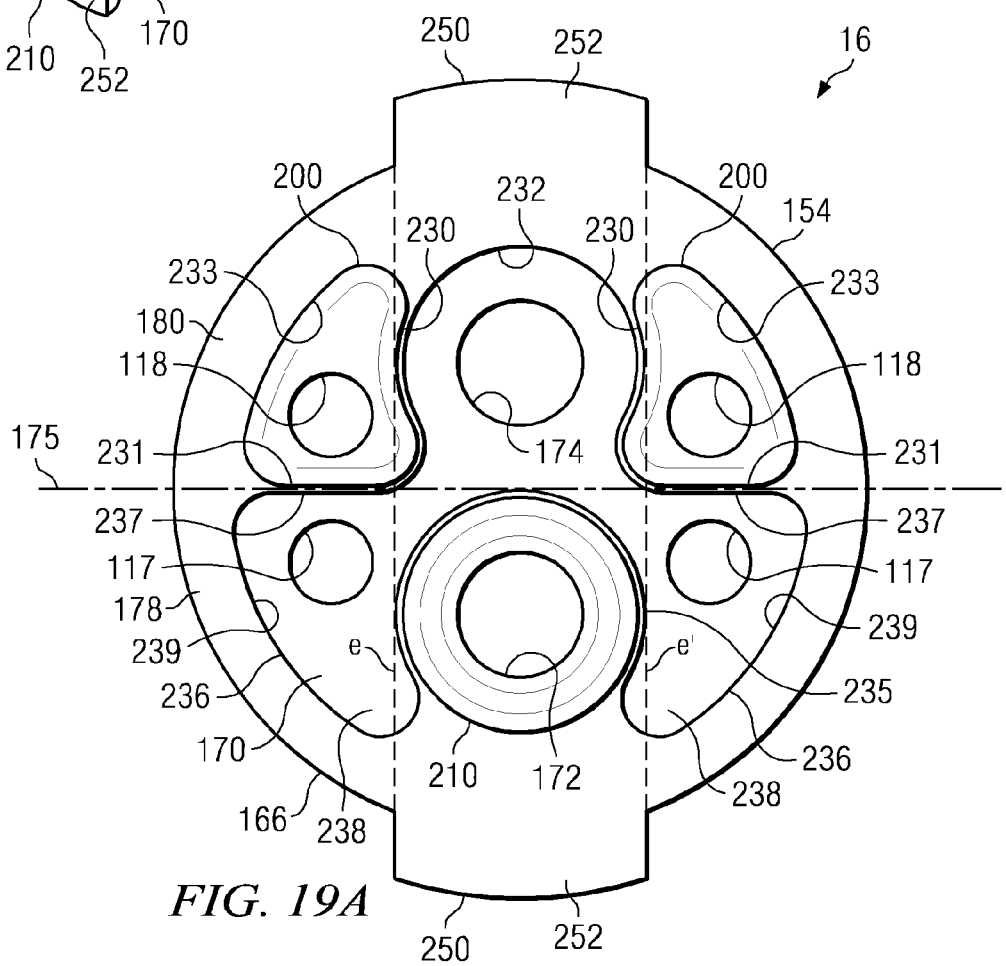
FIG. 19A is an enlarged partial front end view of the plug body of FIG. 19.

Referring to FIGS. 2, 19 and 19A, plug body 16 includes a pair of mating features such as pins 200 extending longitudinally from second half section 180 of face 170 on either side of opening 174. Mating pins 200 have a cross section approximating a quarter circle with rounded corners, opposing concave sides 230, substantially flat sides 231 aligned with plane 175 and outward convex sides 233. Mating pins 200 are oriented with concave sides 230 facing opening 174 such that the mating pins and tower 210 define an aperture 232 therebetween for receiving the tower of a corresponding mating connector or receptacle. In one embodiment, mating pins 200 extend approximately 0.21 inches beyond the forward most end 166 of plug body 16.

Plug body 16 includes axially extending grooves 236 formed in the inside surface of wall 154 that extend forward from face 170 adjacent tower 210. Grooves 236 along with tower 210 define apertures 238 for receiving the corresponding mating pins of an identical connector or receptacle. In one embodiment, grooves 236 extend approximately 0.21 inches rearward from forward end 166 of plug body 16. Apertures 238 have opposing concave walls 235, substantially flat walls 237 aligned with plane 175 and convex outward walls 239. When connector 10 is coupled with a second connector, the tower and mating pins of the second connector are aligned with and inserted into apertures 232, 238 as the connectors are brought together. Similarly, tower 210 and mating pins 200 of connector are inserted into the corresponding apertures of the second connector.

Figure 19B:
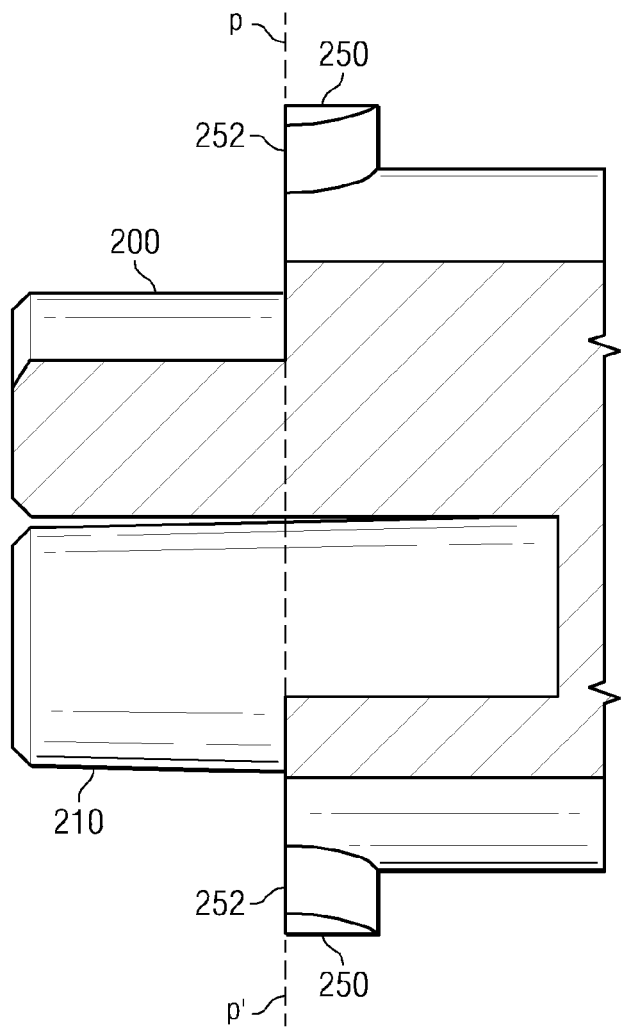
FIG. 19B is a partial side and partial cutaway view of the forward end of the plug body of FIG. 19.

A pair of mating ears 250 extend radially outward from mating end 166 of plug body 16 for coupling connector 10 to a second connector. In one embodiment, each of mating ears 250 have a radial length of approximately 0.05 inches and a circumferential width of approximately 0.20 inches. As best shown in FIG. 19A, ears 250 are located 180 degrees apart on the circumference of plug body 16 between parallel chords e and e' equidistant from the center of the longitudinal axis of plug body 16. As illustrated, ears 250 have a generally semi-cylindrical geometry with a semicircular cross section having a flat mating face 252 flush with mating end 166 of the body. Faces 252 and forward most end 166 of plug body 16 define a mating plane p-p' (FIGS. 9, 19B). Faces 252 are configured to oppose the corresponding faces of the mating ears 252' of a second connector 10' (FIG. 7) when connector 10 is coupled to the second connector.

Referring to FIGS. 4-9 and 14-18, coupling nut 14 is slidably and rotatably mounted over plug body 16 for coupling connector 10 to a receptacle or a second connector. Coupling nut 14 includes a cylindrical wall 272 defining a central longitudinally extending passage 280 for receiving plug body 16. A coil spring 288 disposed in an annular space 290 between wall 272 and wall 154 of plug body 16 abuts annular ring 152 of plug body 16 to bias coupling nut 14 in the rearward direction. A retainer ring 292 positioned in an annular groove 294 formed in the inside surface of wall 272 near the rear end 286 of the wall retains spring 288 and coupling nut 14 on plug body 16. O-ring 157 positioned in groove 158 of plug body 16 prevents foreign material from entering space 290.

As best illustrated in FIGS. 14-18, coupling nut 14 includes a pair of first ribs 300 that extend radially inward from the inside circumference of wall 272 adjacent coupling end 284 of the coupling nut. Ribs 300 each extend over equal and opposed arcs along wall 272. Openings 304 between the ends 302 of first ribs 300 are positioned 180 degrees apart on the inside circumference of wall 272.

A pair of second ribs 310 extends around the inside of wall 272 rearward of ribs 300 to form a pair of arcuate grooves 330 between first ribs 300 and second ribs 310. Second ribs 310 are formed substantially parallel to ribs 300 and extend over the same arcuate intervals or segments as ribs 300 around the inside circumference of wall 272. Arcuate grooves 330 have forward walls 322 defined by ribs 300 and rear walls 324 defined by ribs 310. Walls 322 and 324 are each substantially perpendicular to a longitudinal axis 325 extending through the center of coupling nut 14. The ends 312 of second ribs 310 define opposed openings 314 positioned 180 degrees apart on the inside circumference of wall 272. Openings 314 are longitudinally aligned with openings 304 in first ribs 300.

Ribs 300, 310 form a substantially circular longitudinal opening 332 having a diameter slightly larger than the diameter of forward end 166 of plug body 16. Openings 304 and 314 are sized such that the width of the openings is slightly larger than the width of ears 250 so that coupling nut 14 can slide over plug body 16 when ears 250 are aligned with openings 304 and 314.

Referring to FIGS. 7, 14-18 and 19A, connector 10 is coupled to a second connector by aligning and inserting the mating pins 200 and towers 210 of each of the connectors into the corresponding apertures 232, 238 of the second connector. Alignment of the mating pins 200 and tower 210 with the corresponding apertures also aligns ears 250 of connector 10 with the corresponding ears of the second connector so that faces 252 of the ears oppose the corresponding faces 252' of the second connector as illustrated in FIG. 7. When an ear 250 is placed in opposed mating relationship with an ear 250' of a second connector 10' or receptacle, the opposed ears form a generally cylindrical projection having a substantially circular cross-section.

As connectors 10 and 10' are pushed together, ferrules 46, 46' of the aligned connectors meet, compressing springs 54, 54' of termini 45 as the termini move to the rear. Coupling nut 14 is pushed from the rearward position forward over plug body 16 until opposed ears 250, 250' of each connector pass through openings 304 between the ends of first ribs 300 and into alignment with grooves 330. Coupling nut 14 is then rotated approximately 90 degrees, trapping ears 250, 250' of connectors 10 and 10' in grooves 330 between ribs 300, 310.

Ribs 300, 310 are configured such that the width of groove is less than the width or diameter of a pair of opposed ears 250 plus the predetermined longitudinal travel of opposed ferrules 46 permitted by springs 54. In this manner, ferrules 46 of mated connectors 10 are maintained in biased opposed contact when the connectors are coupled. In the illustrated embodiment, the distance, denoted Wg (FIG. 17), between walls 322 and 324, i.e., the width of grooves 330, is selected to substantially match the combined width, denoted We (FIGS. 7, 9) of the opposed ears 250 when connector 10 and the second connector are pushed firmly together. Thus, the groove 330 holds ears 250, and therefore connectors 10 (or a connector and receptacle) operatively together against the biasing force of the termini springs 54.

Turning to FIGS. 14-19 rotation of coupling nut 14 is limited by means of one or more stops 316 formed on the inside of wall 272 of the coupling nut rearward of second ribs 310. Stops 316 engage corresponding stop walls 224 that extend radially outward from wall 154 of plug body 16. Stops 316 and stop walls 224 are circumferentially positioned on coupling nut 14 to limit the rotation of coupling nut 14 to approximately 100 degrees. These features prevent over-rotation of coupling nut 14 when connector 10 is coupled to a second connector.

Coupling nut 14 is maintained in the coupled position by means of a compressible member 226 positioned in a recess 228 in each of stop walls 224. As coupling nut 14 is rotated to the coupled position, a pair of opposing projections or wedges 318 formed on the inside surface of wall 272 of the coupling nut compress and rotate past members 226. When wedges 318 pass members 226, the members expand to the uncompressed state, preventing coupling nut 14 from rotating in the reverse direction due to vibration or incidental movement of connector 10. Wedges 318 are positioned on the inside circumference of coupling nut 14 so that wedges 318 rotate over members 226 as the nut is rotated approximately 90 degrees from its initial position. In one variation, wedges 318 include an inclined face 320 to facilitate movement of member 226 over the wedge. Since stops 316 prevent further rotation of coupling nut 14, the nut is retained in the selected rotational position.

Figure 20:
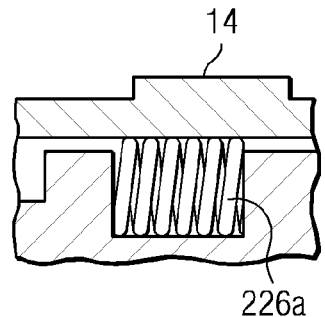
FIGS. 20-22 are partial sectional views of the encircled area of FIG. 19 wherein alternate versions of a compressible member are illustrated therein.
Figure 21:
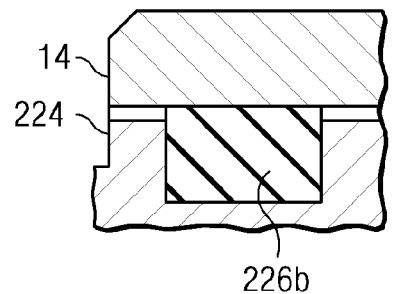
Figure 21A:
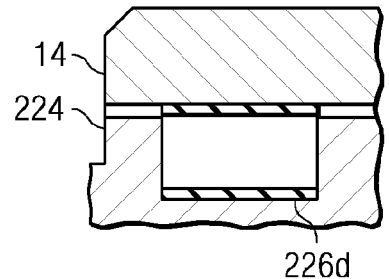
Figure 22:
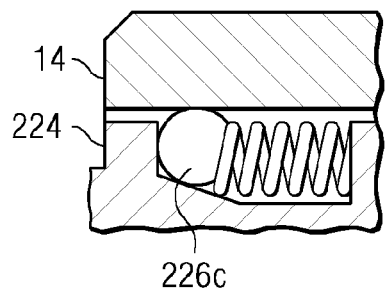
Figure 23:
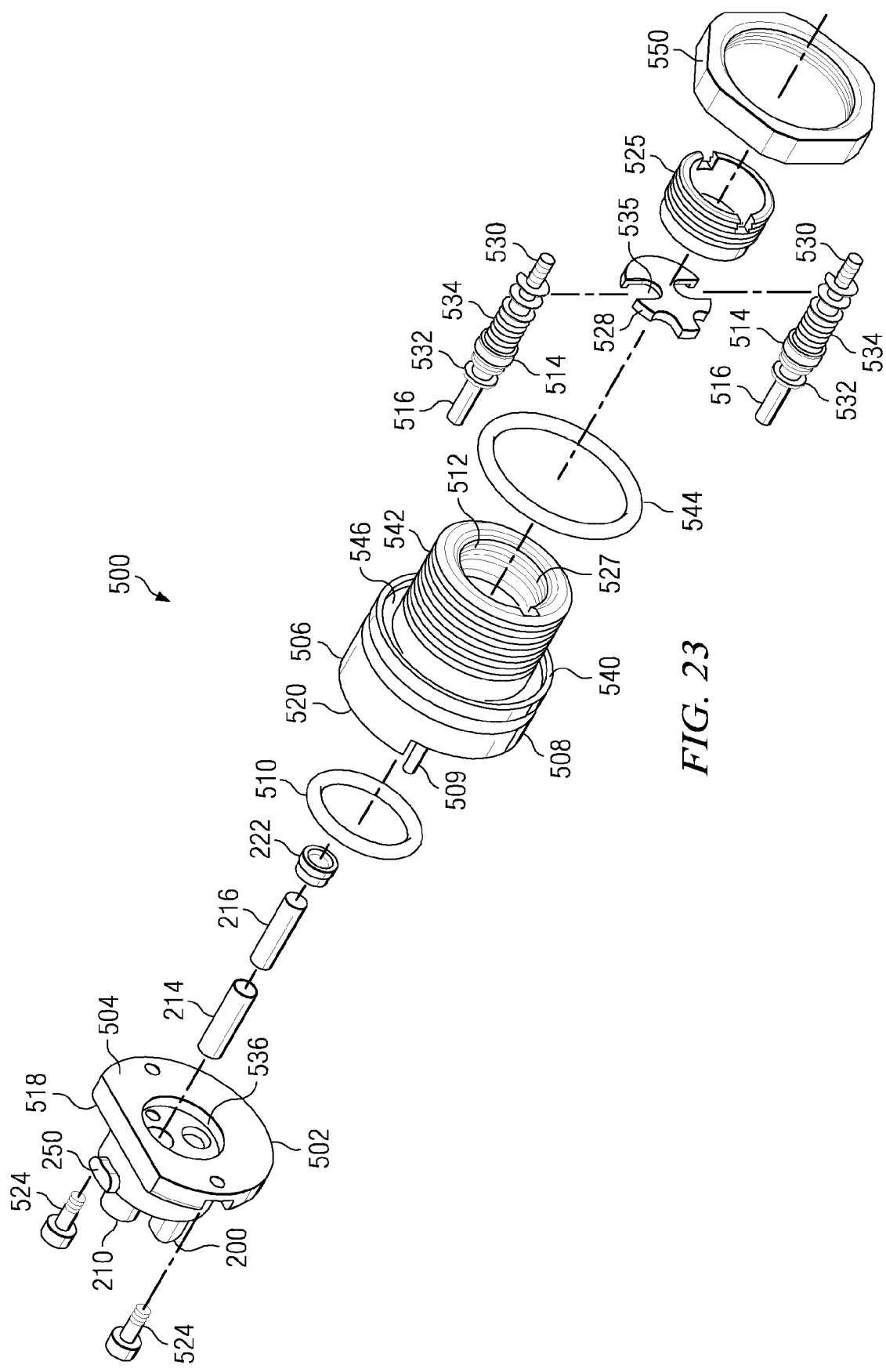
FIG. 23 is an exploded view of the receptacle of FIGS. 8 and 9.
Figure 24:
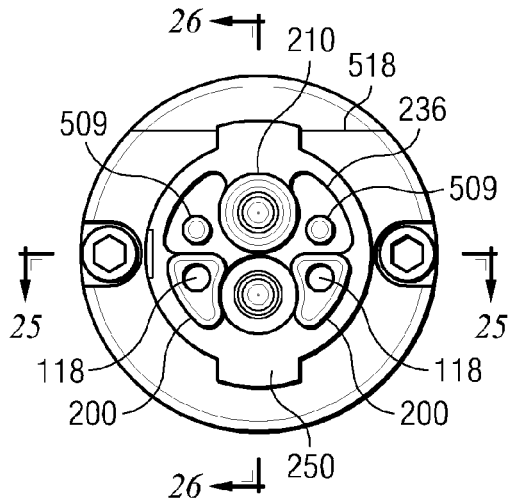
FIG. 24 is a front end view of the receptacle of FIG. 23.
Figure 26:
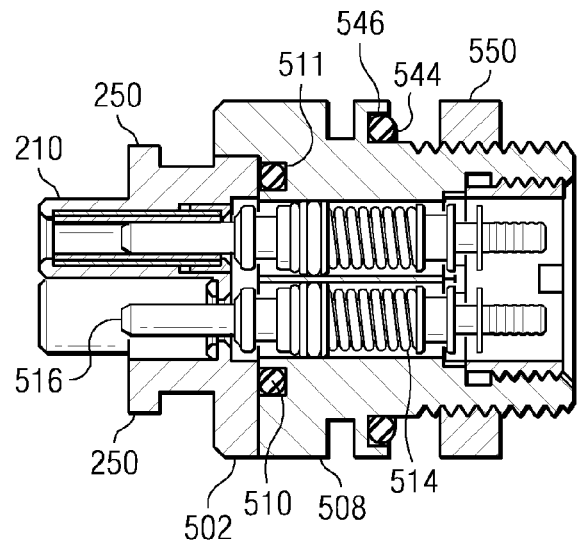
FIG. 26 is partial sectional and partial cutaway view of the receptacle of FIG. 23 taken along line 26-26 of FIG. 24.
Figure 25:
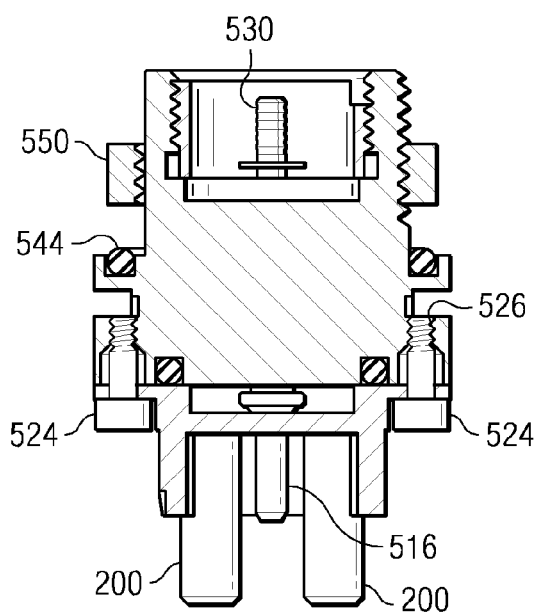
FIG. 25 is partial sectional and partial cutaway view of the receptacle of FIG. 23 taken along line 25-25 of FIG. 24.
Figure 27:
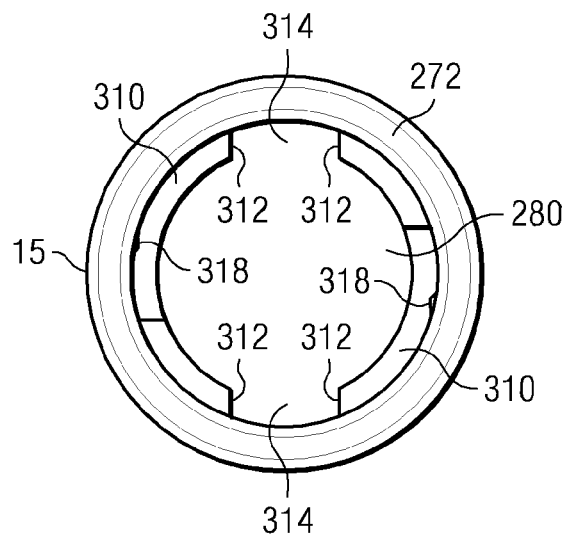
FIG. 27 is a rear end view of an alternate coupling nut.
Figure 28:
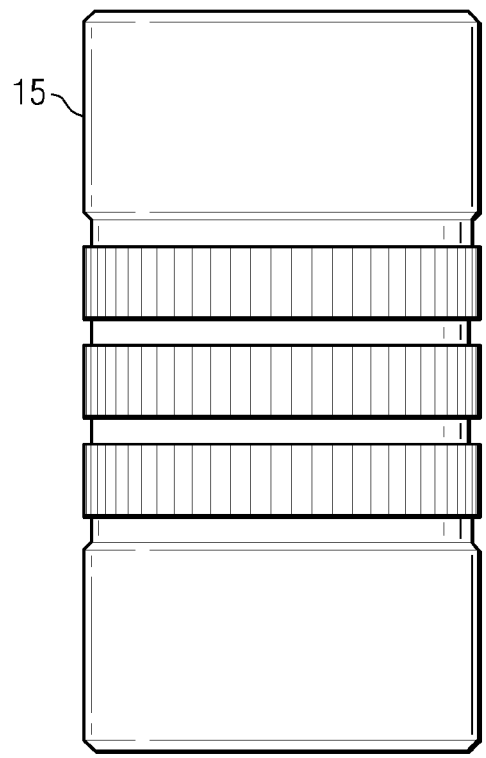
FIG. 28 is a side view of the coupling nut of FIG. 27.
Figure 29:
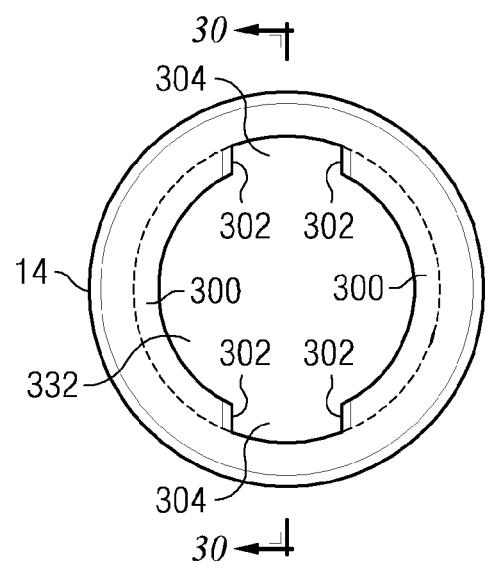
FIG. 29 is a front end view of the coupling nut of FIG. 27.
Figure 30:
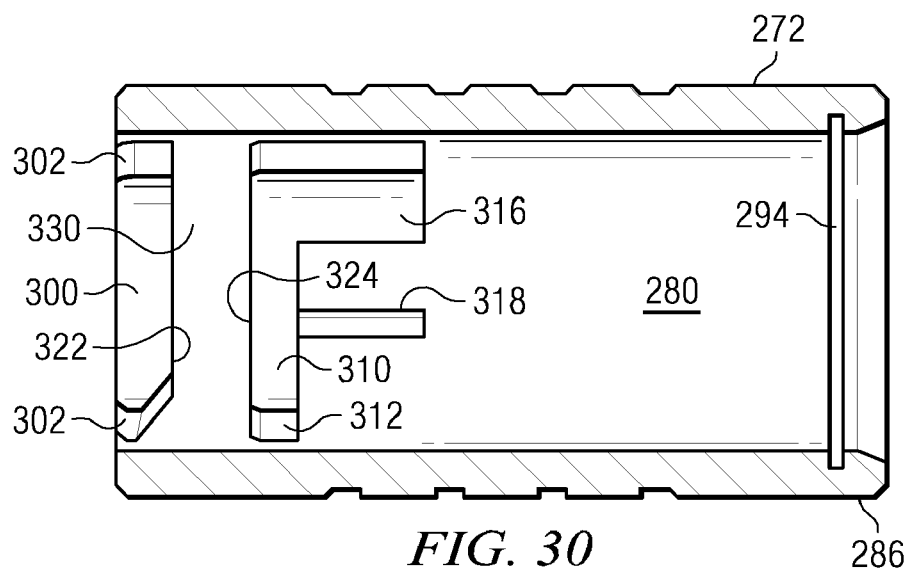
FIG. 30 is a sectional view of the coupling nut of FIG. 27 taken along line 30-30 of FIG. 29.
Figure 31:
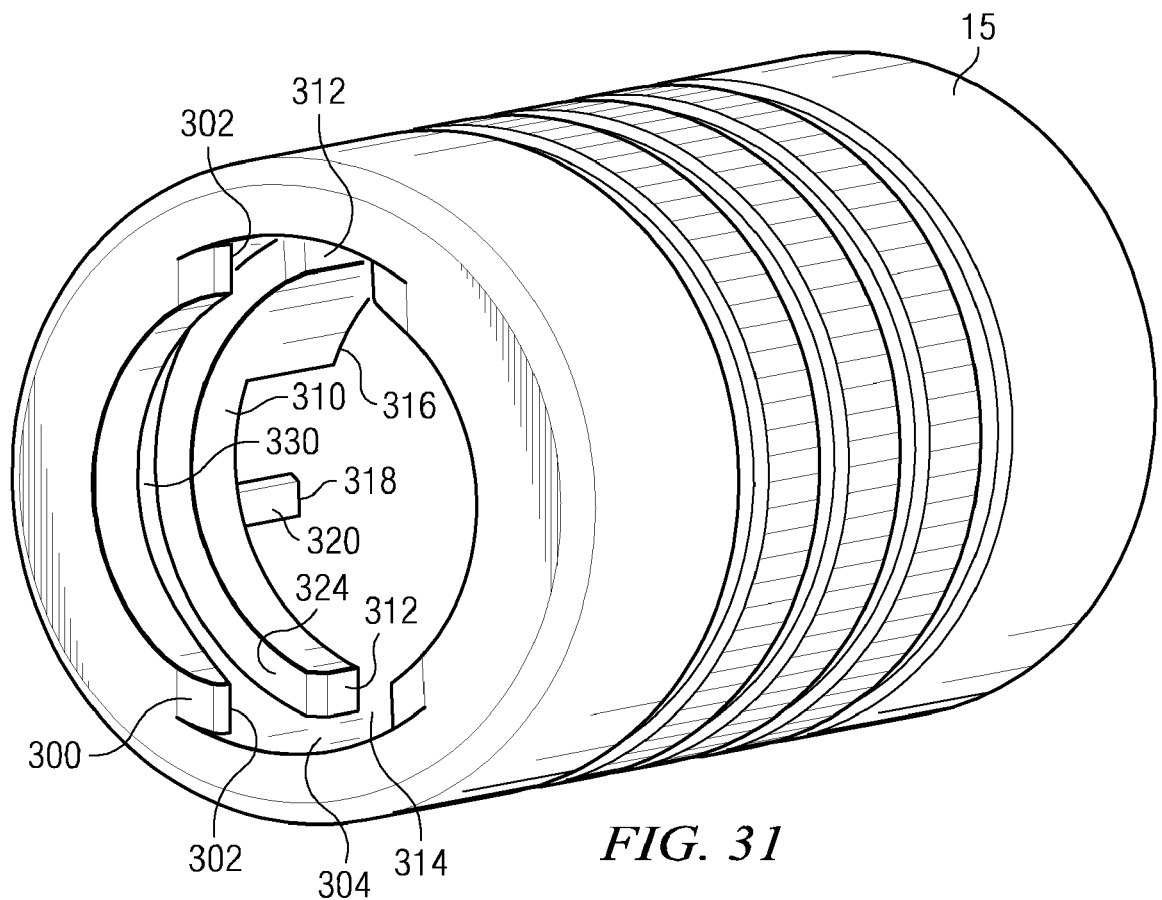
FIG. 31 is a perspective view of the coupling nut of FIG. 27.

Members 226 and wedges 318 may be selected and sized as to permit rotation of coupling nut 14 in the reverse direction only with the application of a predetermined force. As illustrated in FIGS. 20-22, member 226 may comprise a coil spring 226a, (FIG. 20) a compressible plastic or rubber cylinder 226b (FIG. 21), or a spring biased spherical member 226c (FIG. 22). In one embodiment, illustrated in FIG. 21A, member 226d comprises a phosphorous bronze metal cylinder, similar to a roll pin. Preferably, members 226 are selected to have sufficient resistance to compression to provide a user with a discernable tactile indication or "snap" when wedges 318 rotate over the members, indicating that connector 10 is fully engaged.

Conventional bayonet connectors rely on the engagement of one or more pins in the short leg of a J-shaped groove to prevent the connector from inadvertently loosening. Stop walls 224 and stops 316 along with compressible members 226 and wedges 318 provide a rotational stop and click mechanism that eliminates the need for J-shaped grooves of conventional bayonet-type connectors, permitting the use of a straight groove for capturing and holding receiving ears 252. The use of a straight groove or grooves 330 eliminates the rearward movement of the connector faces associated with the pins of conventional bayonet connector moving into the short leg or recess of the J-shaped groove.

Stop walls 224 in conjunction with second ribs 310 also provide an additional alignment feature. When coupling nut 14 is in the rearward position, walls 224 are positioned in openings 314 between second ribs 310, preventing rotation of the coupling nut. In order to rotate coupling nut 14, the nut must be moved forward until second ribs 310 are forward of stop walls 224. This feature insures that coupling nut 14 is maintained in the proper orientation for coupling when not in use.

In the embodiment shown in FIGS. 14-18, a pair of circumferentially extending slots 336 are formed during the machining process extending completely though the outer surface of coupling nut 14. In an alternate embodiment, a coupling nut 15, illustrated in FIGS. 27-31 is formed without an externally visible slot 336, but with substantially identical internal features, identified with the same reference numbers, as coupling nut 14. Coupling nut 15 can be used as part of a connector 10 substantially identical to that illustrated in FIGS. 1-8, except without the externally visible slot 336. Operation of the connector 10 with alternate coupling nut 15 is substantially identical to that previously described.

Referring to FIGS. 8, 9 and 23-26, a receptacle 500, adapted for panel mounting, includes a forward mating fixture 502 having a base 504 and substantially identical mounting features as the forward end 166 of plug body 16. Such features are identified with the same reference numbers previously used in connection with plug body 16. Fixture 502 is mounted on the enlarged diameter forward end 506 of a cylindrical housing 508 that defines a cylindrical cavity 512 for receiving a pair of termini 514 having ferrules 516. Base 504 includes a flattened side 518 that abuts a ledge 520 formed on the forward end 506 of housing 508 to align the base in the proper rotational orientation relative to the housing. A pair of alignment pins 509 extend longitudinally from the forward end 506 of housing 508 for engagement in bores 118 of a corresponding connector. Fixture 502 is mounted on housing 508 with a pair of screws 524 that engage threaded apertures 526 formed in the housing. An O-ring 510 is seated in an annular groove 511 formed on the forward end 506 of housing 508 to seal between fixture 502 and housing 508.

Termini 514 are mounted in cylindrical housing 508 of receptacle 500 with a guide 528 that receives the ends 530 of pin bodies 532 of the termini in cutouts 535. Guide 528 is retained in housing 508 with a threaded insert 525 that engages internal threads 527 formed on the inside surface of the housing. Ferrules 516 are biased with springs 534 in the same manner as ferrules 46 described above to provide a predetermined amount of longitudinal travel during connection. Ferrules 516 extend through a recess 536 formed in the rear face of base 504 into fixture 502 for mating engagement with the ferrules of a corresponding connector such as connector 10. As best illustrated in FIG. 9, when connector 10 is coupled with receptacle 500, the mating ends of ferrules 46 of the connector and receptacle are substantially coplanar with the mating faces 252 of ears 250 of the connector and receptacle.

A rearwardly facing, radially extending wall 540 extends between a threaded rear end portion 542 of receptacle 500 and enlarged diameter portion 506. Threaded end portion 542 of receptacle 500 is configured for insertion though a panel opening with a wall 540 abutting the panel. An O-ring 544 seated in an annular groove 546 formed in wall 540 provides an environmental seal between connector 500 and the wall of the panel. Receptacle 500 is secured in the panel wall with a nut 550 threaded over end 542 of the receptacle.

The drawings and detailed description herein are to be regarded in an illustrative rather than a restrictive manner, and are not intended to limit the following claims to the particular forms and examples disclosed. On the contrary, further modifications, changes, rearrangements, substitutions, alternatives, design choices, and embodiments will be apparent to those of ordinary skill in the art. Thus, it is intended that the following claims be interpreted to embrace all such further modifications, changes, rearrangements, substitutions, alternatives, design choices, and embodiments.

The invention claimed is:

1. A hermaphroditic connector for mounting to a cable having a plurality of optical fibers and connecting the fibers to mating optical fibers wherein the optical fibers and mating optical fibers have termini mounted to the respective ends thereof, and wherein the termini of at least one of the optical fibers and mating optical fibers are slidably mounted and biased to provide a predetermined amount of longitudinal travel during connection, the connector comprising:

a plug insert for mounting the termini;

a plug body for receiving the plug insert therein, the plug body including a mating end having a plurality of mating features configured to engage the corresponding mating features of a second connector to align the termini of the connector with the termini of a second connector in opposed relationship;

a plurality of ears extending radially from the mating end of the plug body;

a coupling nut including a generally cylindrical wall, the coupling nut having first and second ends and a groove for receiving the ears of the connector and the ears of a mating connector in opposed relationship therein, the groove extending around an inside surface of the cylindrical wall adjacent the first end of the coupling nut; and wherein the coupling nut is slidably mounted on the plug body between a rear position wherein the ears are forward of the coupling and a forward position wherein the groove is aligned with the ears and rotatable in the forward position to capture the ear of the connector and the ear of the mating connector in opposed relationship in the groove.

2. The connector of claim 1 further comprising a spring disposed between the plug body and the coupling nut for biasing the coupling nut in a rearward position on the plug body.

3. The connector of claim 1 wherein a pair of ears are positioned at opposed positions on the circumference of the mating end of the plug body and wherein the ears pass through a pair of opposed openings into the groove when the coupling nut is moved into the forward position.

4. The connector of claim 1 further comprising a shield for mounting the plug insert in the plug body, the shield including alignment features for aligning the shield and plug insert in a selected rotational orientation relative to the plug body.

5. The connector of claim 1 wherein the width of the groove is substantially equal to the combined width of the opposed ears.

6. The connector of claim 1 wherein the width of the groove is less than the combined width of the opposed ears plus the predetermined longitudinal travel of the termini.

7. The connector of claim 6 further comprising a floating ring positioned in an annular groove formed in the outside surface of at least one of the termini;
a resilient O-ring is mounted in the floating ring for sealing between the terminus and the inside wall of one of the bores.

8. The connector of claim 1 wherein the coupling nut further comprises an internal stop for limiting rotation of the nut when the connector is coupled with a corresponding connector or receptacle.

9. The connector of claim 8 wherein the plug body further comprises a stop wall, the internal stop of the coupling nut engaging the stop wall at a selected rotational position.

10. The connector of claim 1 wherein the plug body further comprises a resilient member disposed on a surface thereof for retaining the coupling nut in a preselected rotational position.

11. The connector of claim 10 wherein the coupling nut further comprises an internally disposed feature for engaging the resilient member to retain the coupling nut in the preselected position.

12. The connector of claim 1 wherein the mating features comprise a plurality of projections extending longitudinally from the plug body.

13. The connector of claim 10 wherein the mating features comprise a plurality of apertures formed in the forward end of the plug body.

14. A hermaphroditic connector for mounting to a cable having a plurality of optical fibers and connecting the fibers to mating optical fibers wherein the optical fibers and mating optical fibers have termini mounted to the respective ends thereof, and wherein the termini of at least one of the optical fibers is slidably mounted and biased to provide a predetermined amount of longitudinal travel during connection, the connector comprising:
a plug insert for mounting the termini;
a plug body for receiving the plug insert through an open end thereof, the plug body including a mating end with a plurality of mating features configured to cooperate with corresponding mating features of a second connector to align the termini of the first and second connectors in opposed relationship, the plug body further including a plurality of openings for receiving ferrules of the termini therethrough and wherein the ferrules move longitudinally upon mating the connector with a second connector;
a plurality of ears extending radially from the mating end of the plug body;
a coupling nut slidably mounted on the plug body for movement between a first and second position;
a plurality of substantially parallel ribs extending partially around an inside surface of the cylindrical wall adjacent a first end of the coupling nut and a groove extending around an inside surface of the cylindrical wall between the ribs, the ribs defining a plurality of openings between ends thereof for receiving the ears of the connector and corresponding ears of a second connector in alignment within the groove when the coupling nut is in the forward position; and wherein
rotation of the coupling nut in the second position captures the ears of the connector and the ears of the second connector in the groove in opposed relationship between the ribs.

15. The connector of claim 14 wherein the width of the groove is less than the combined width of the opposed ears plus the predetermined longitudinal travel of the termini.

16. The connector of claim 14 wherein the mating features comprise a plurality of mating pins extending from the plug body and a plurality of apertures for receiving the corresponding mating pins of a second connector or receptacle.

17. The connector of claim 14 further comprising a wedge for retaining a fiber optic cable in the connector, the wedge engaging a strength member of the cable between the wedge and the plug insert.

18. A hermaphroditic receptacle for mounting to a cable having a plurality of optical fibers and connecting the fibers to mating optical fibers wherein the optical fibers and mating optical fibers have termini mounted to the respective ends thereof, and wherein the termini of at least one of the optical fibers and mating optical fibers are slidably mounted and biased to provide a predetermined amount of longitudinal travel during connection, the receptacle comprising:
a housing for mounting the termini;
a mating fixture mounted on a forward end of the housing;
a plurality of mating features extending longitudinally from the mating fixture, the mating features configured to engage the corresponding mating features of a mating connector to align the termini of the connector with the termini of a second connector in opposed relationship;
a plurality of ears extending radially from the mating fixture, each of the ears having a mating face for opposing the mating face of the corresponding ear of a mating connector in opposed relationship; and,
wherein the forwardmost ends of the termini are substantially coplanar with the mating faces of the ears when the mating connector is coupled to the receptacle.

19. The receptacle of claim 18 wherein a pair of ears are positioned at opposed positions on the circumference of the mating fixture.

20. The receptacle of claim 18 wherein the cylindrical housing further comprises a radially extending rear wall and a threaded end portion extending rearward from the wall for mounting the receptacle.

21. A hermaphroditic connector for mounting to a cable having a plurality of optical fibers and connecting the fibers to mating optical fibers wherein the optical fibers and mating optical fibers have termini mounted to the respective ends thereof, and wherein the termini of at least one of the optical fibers and mating optical fibers are slidably mounted and biased to provide a predetermined amount of longitudinal travel during connection, the connector comprising:
- a plug insert for mounting the termini;
- a plug body for receiving the plug insert therein, the plug body having a central longitudinal axis and including a mating end having first and second openings extending longitudinally therethrough for receiving the ends of termini therein, the openings positioned on opposing sides of a plane extending longitudinally thorough the plug body perpendicular to a line connecting the centers of the openings and intersecting the longitudinal axis of the plug body, the plane dividing the mating end into first and second halves;
- a tower extending from the first half of the mating end of the plug body, the tower having a longitudinal passage therethrough aligned with the first opening for receiving an end of a termini of a corresponding mating connector;
- first and second mating pins extending longitudinally from the second half of the mating end of the plug body, the mating pins having first opposed faces defining a tower receiving aperture therebetween for receiving the tower of a corresponding mating connector, the mating pins having second faces substantially aligned with the plane dividing the mating end into first and second halves and third faces disposed between the first and second faces; and
- the first half of the mating end of the plug body having first and second recesses formed therein on opposing sides of the tower for receiving the mating pins of a corresponding mating connector, the recesses having first walls formed on opposing sides of the tower, second walls aligned with the plane dividing the mating end into first and second halves and third walls disposed between the first and second walls.

22. The connector of claim 21 wherein the first faces of the mating pins and the first walls of the recesses are substantially concave.

23. The connector of claim 22 wherein the second faces of the mating pins and the second walls of the recesses are substantially flat.

24. The connector of claim 23 wherein the third faces of the mating pins and the third walls of the recesses are substantially convex.

25. The connector of claim 21 wherein the tower is substantially cylindrical.

26. The connector of claim 25 wherein the diameter of the tower is approximately 25% to 35% of the diameter of the mating end.

27. The connector of claim 21 further comprising a pair circumferentially opposed ears extending radially from the mating end of the plug body between a pair of chords equidistant from the axis of the plug body and perpendicular to the plane dividing the mating end into first and second halves.

28. The connector of claim 27 wherein the ears have a semi-circular cross section and a combined radial length of approximately 15% to 20% of the diameter of the mating end of the plug body.

29. The connector of claim 27 further comprising a pair of alignment pins extending from the forward end of the mating end of the plug body and wherein the mating pins have longitudinally extending bores formed therein for receiving the alignment pins of a corresponding connector.

30. A hermaphroditic connector for mounting to a cable having a plurality of optical fibers and connecting the fibers to mating optical fibers wherein the optical fibers and mating optical fibers have termini mounted to the respective ends thereof, and wherein the termini of at least one of the optical fibers and mating optical fibers are slidably mounted and biased to provide a predetermined amount of longitudinal travel during connection, the connector comprising:
- a plug insert for mounting the termini;
- a plug body for receiving the plug insert therein, the plug body including a mating end having a plurality of mating features configured to engage the corresponding mating features of a second connector to align the termini of the connector with the termini of a second connector in opposed relationship;
- a plurality of ears extending radially from the mating end of the plug body;
- a coupling nut including a generally cylindrical wall, the coupling nut defining an annular space between an inside surface of the coupling nut and the plug body;
- a spring positioned in the annular space for biasing the coupling nut in a rearward position.

31. The connector of claim 30 wherein the spring is a coil spring and the plug body passes through the coil spring.

32. The connector of claim 30 wherein the coil spring is positioned between an annular ring formed on an outside wall of the plug body and a retaining ring extending inwardly from an inside wall of the coupling nut.

33. The connector of claim 30 wherein the coupling nut includes first and second ends and a groove for receiving the ears of the connector and the ears of a mating connector in opposed relationship therein, the groove extending around an inside surface of the cylindrical wall adjacent the first end of the coupling nut; and
- wherein the coupling nut is slidably mounted on the plug body between a rear position wherein the ears are forward of the coupling nut and a forward position wherein the groove is aligned with the ears and rotatable in the forward position to capture the ear of the connector and the ear of the mating connector in opposed relationship in the groove.

34. A hermaphroditic connector for mounting to a cable having a plurality of optical fibers and connecting the fibers to mating optical fibers wherein the optical fibers and mating optical fibers have termini mounted to the respective ends thereof, and wherein the termini of at least one of the optical fibers and mating optical fibers are slidably mounted and biased to provide a predetermined amount of longitudinal travel during connection, the connector comprising:
- a plug insert for mounting the termini;
- a plug body for receiving the plug insert therein, the plug body including a cylindrical wall and a mating end having a plurality of mating features configured to engage the corresponding mating features of a second connector to align the termini of the connector with the termini of a second connector in opposed relationship;
- a radially extending stop wall formed on an outside surface of the cylindrical wall; and
- a generally cylindrical coupling nut including a stop formed on an inside surface thereof; and
- wherein the stop of the connector engages the stop wall of the corresponding second connector upon rotation of the coupling nut to couple the connector with the second connector such that rotation of the coupling nut is limited to a predetermined arc.

35. The connector of claim 34 wherein the arc is between about 80 degrees and about 110 degrees.

36. The connector of claim 34 further comprising a compressible retaining member positioned on an outside surface of the cylindrical wall and wherein the coupling nut further comprises a projection extending radially inward from an inside wall thereof for engaging the compressible retaining member of the corresponding second connector and wherein the projection of the second connector compresses and passes the retaining member upon rotation of the coupling nut such that the compressible member retains the coupling nut second connector in engagement with the connector.

37. The connector of claim 35 wherein the projection is wedge-shaped with an inclined wall to facilitate engagement with a compressible member of a corresponding mating connector.

38. The connector of claim 35 wherein the compressible member is one of a spring, a solid resilient body, a compressible cylinder or a spring-biased body having an arcuate surface for engaging the projection.

39. The connector of claim 35 further comprising:
a pair of ears extending radially from the mating end of the plug body and wherein the coupling nut further comprises first and second ends and a groove for receiving the ears of the connector and the ears of a mating connector in opposed relationship therein, the groove extending around an inside surface of the cylindrical wall adjacent the first end of the coupling nut; and
wherein the coupling nut is slidably mounted on the plug body between a rear position wherein the ears are forward of the coupling and a forward position wherein the groove is aligned with the ears and rotatable in the forward position to capture the ear of the connector and the ear of the mating connector in opposed relationship in the groove.

40. The connector of claim 35 further comprising a spring disposed between the plug body and the coupling nut for biasing the coupling nut in a rearward position on the plug body.

41. A hermaphroditic connector for mounting to a cable having a plurality of optical fibers and connecting the fibers to mating optical fibers wherein the optical fibers and mating optical fibers have termini mounted to the respective ends thereof, and wherein the termini of at least one of the optical fibers and mating optical fibers are slidably mounted and biased to provide a predetermined amount of longitudinal travel during connection, the connector comprising:
a plug insert having a generally cylindrical body including a circular forward face formed integral with the body including a plurality of apertures extending through the face configured for slidably mounting termini in the plug insert and at least one axial slot extending rearward from the forward face; and
a plug body for receiving the plug insert therein, the plug body including a mating end having a plurality of mating features configured to engage the corresponding mating features of a second connector to align the termini of the connector with the termini of a second connector in opposed relationship;
wherein the plug insert further comprises
a rear section extending rearward of the slot including a rearwardly opening socket, a forwardly tapered hole having a substantially conical wall and opening into the slot and a central passage extending axially between the socket and the forwardly tapered hole; and
a wedge having a nose with profile substantially matching a portion of the wall of the forwardly tapered hole wherein the wedge is operable to engage the plug insert and compress and hold the strength member of a fiber optic cable between the wedge and the conical wall.

42. The connector of claim 41 wherein the socket includes internal threads and the wedge further comprises a threaded end portion for threadedly engaging the socket.

* * * * *